(12) United States Patent
LaVen et al.

(10) Patent No.: US 8,790,840 B2
(45) Date of Patent: Jul. 29, 2014

(54) SYSTEMS AND METHODS FOR FUEL CELL THERMAL MANAGEMENT

(75) Inventors: Sudha Rani LaVen, Bend, OR (US); Luc Rouveyre, Bend, OR (US)

(73) Assignee: DCNS SA, La Montagne (FR)

( * ) Notice: Subject to any disclaimer, the term of this patent is extended or adjusted under 35 U.S.C. 154(b) by 434 days.

(21) Appl. No.: 12/721,250

(22) Filed: Mar. 10, 2010

(65) Prior Publication Data
US 2011/0223507 A1    Sep. 15, 2011

(51) Int. Cl.
*H01M 8/04*    (2006.01)

(52) U.S. Cl.
CPC ...... *H01M 8/04335* (2013.01); *H01M 8/04298* (2013.01); *H01M 8/04313* (2013.01)
USPC ............................ 429/442; 429/428; 429/433

(58) Field of Classification Search
CPC ........................ H01M 8/0432; H01M 8/04335
See application file for complete search history.

(56) References Cited

U.S. PATENT DOCUMENTS

| | | |
|---|---|---|
| 2,824,620 A | 2/1958 | De Rosset |
| 3,336,730 A | 8/1967 | McBride et al. |
| 3,338,681 A | 8/1967 | Kordesch |
| 3,350,176 A | 10/1967 | Green et al, |
| 3,469,944 A | 9/1969 | Bocard et al, |
| 3,522,019 A | 7/1970 | Buswell et al. |
| 3,655,448 A | 4/1972 | Setzer |
| 4,098,959 A | 7/1978 | Fanciullo |
| 4,098,960 A | 7/1978 | Gagnon |
| 4,175,165 A | 11/1979 | Adlhart |
| 4,214,969 A | 7/1980 | Lawrance |
| 4,468,235 A | 8/1984 | Hill |
| 4,729,930 A * | 3/1988 | Beal et al. ................... 429/431 |
| 5,401,589 A | 3/1995 | Palmer et al. |
| 5,432,710 A | 7/1995 | Ishimaru et al. |
| 5,637,414 A | 6/1997 | Inoue et al. |
| 5,861,137 A | 1/1999 | Edlund |
| 5,997,594 A | 12/1999 | Edlund et al. |
| 6,083,637 A | 7/2000 | Walz et al. |
| 6,221,117 B1 | 4/2001 | Edlund et al. |
| 6,242,120 B1 | 6/2001 | Herron |
| 6,319,306 B1 | 11/2001 | Edlund et al. |

(Continued)

FOREIGN PATENT DOCUMENTS

WO    WO 2005/119824    12/2005

OTHER PUBLICATIONS

International Search Report and Written Opinion for PCT Patent Application Serial No. PCT/US11/027893, dated May 5, 2011.

*Primary Examiner* — Ula C Ruddock
*Assistant Examiner* — Scott J Chmielecki
(74) *Attorney, Agent, or Firm* — Dascenzo Intellectual Property Law, P.C.

(57) ABSTRACT

Thermal and hydration management systems and methods for fuel cell systems, including control of electrolytic membrane hydration levels. In some embodiments, the thermal properties of the fuel cell are controlled based on a variable associated with the oxidant supply stream and/or a variable associated with the fuel cell energy output. In some embodiments, the temperature of the fuel cell is controlled based on the temperature of the oxidant supply stream. In some embodiments, the temperature range across the fuel cell stack is controlled based on the flow rate of the oxidant stream and the electrical output generated by the fuel cell stack. In some embodiments, the humidity within the fuel cell stack is controlled. In some embodiments, the liquid water content of the cathode exhaust stream is controlled.

26 Claims, 7 Drawing Sheets

(56) References Cited

U.S. PATENT DOCUMENTS

| | | |
|---|---|---|
| 6,376,113 B1 | 4/2002 | Edlund et al. |
| 6,383,670 B1 | 5/2002 | Edlund et al. |
| 6,465,118 B1 | 10/2002 | Dickman et al. |
| 6,494,937 B1 | 12/2002 | Edlund et al. |
| 6,495,277 B1 | 12/2002 | Edlund et al. |
| 6,522,955 B1 | 2/2003 | Colborn |
| 6,562,111 B2 | 5/2003 | Edlund et al. |
| 6,746,790 B2 | 6/2004 | Colborn |
| 6,841,276 B2 | 1/2005 | Colborn |
| 6,929,785 B2 | 8/2005 | Grieve et al. |
| 2003/0162066 A1* | 8/2003 | Shiraishi et al. .............. 429/26 |
| 2004/0001985 A1* | 1/2004 | Alva .............................. 429/26 |
| 2005/0186455 A1* | 8/2005 | Kaye et al. .................... 429/17 |
| 2005/0233201 A1* | 10/2005 | Yoshizawa et al. ............ 429/38 |
| 2007/0042247 A1 | 2/2007 | Baird et al. |
| 2007/0238010 A1* | 10/2007 | Zhang et al. ................... 429/44 |
| 2007/0264546 A1 | 11/2007 | LaVen |
| 2008/0299420 A1 | 12/2008 | Kelley et al. |
| 2008/0299423 A1 | 12/2008 | LaVen |
| 2008/0299429 A1 | 12/2008 | Desrosiers et al. |

* cited by examiner

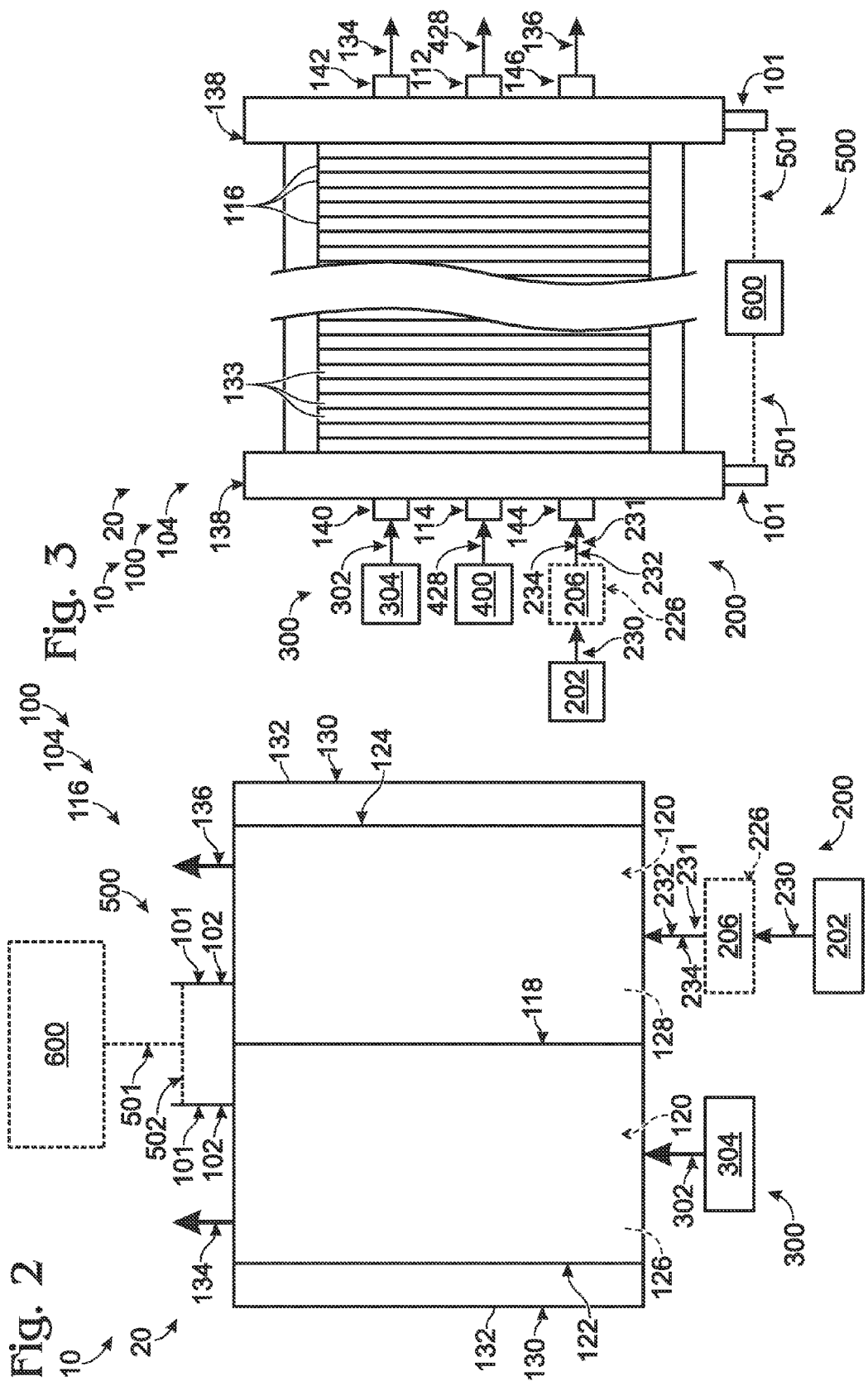

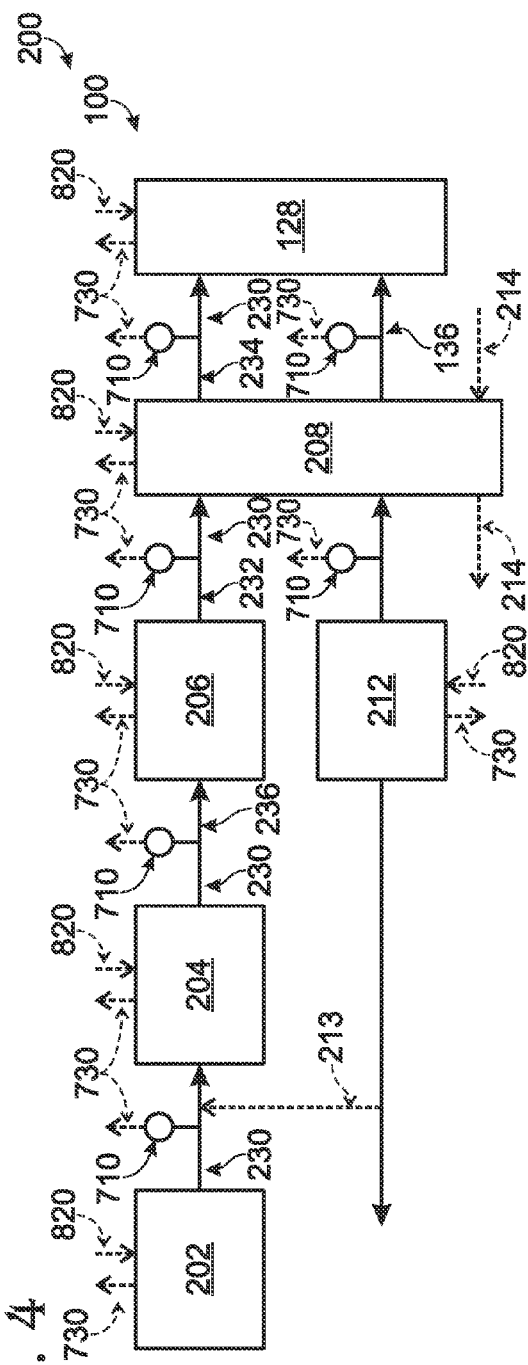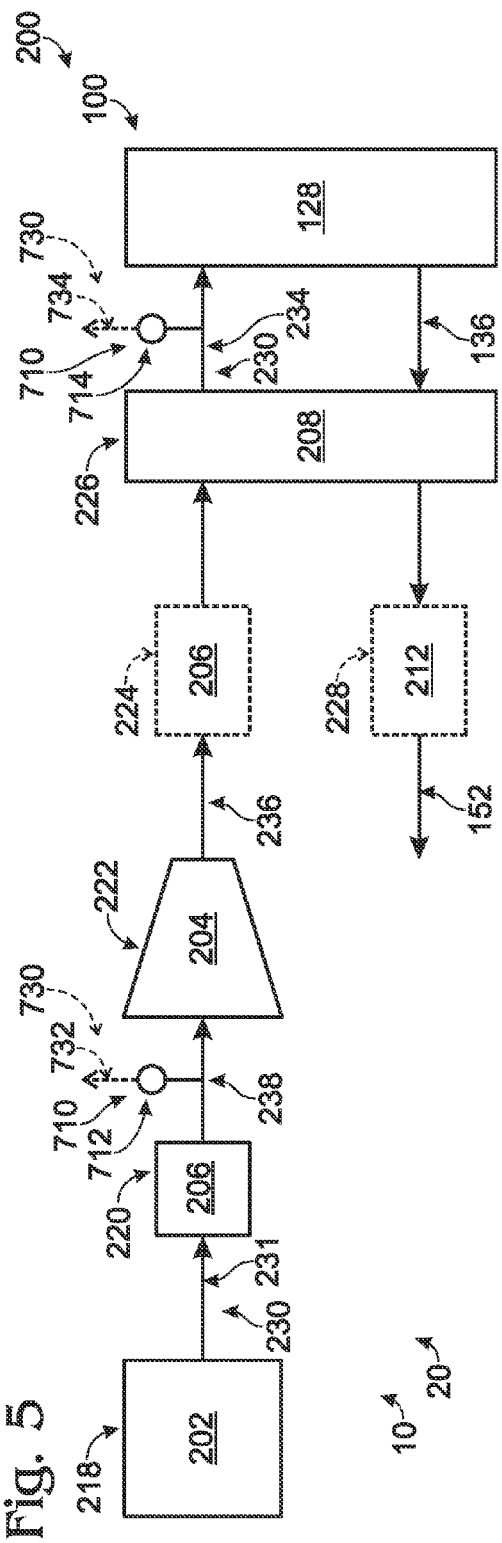

SYSTEMS AND METHODS FOR FUEL CELL THERMAL MANAGEMENT

FIELD OF THE DISCLOSURE

The present disclosure is related generally to thermal and hydration management systems and methods, and more specifically to systems and methods for thermal management and hydration control in fuel cell systems.

BACKGROUND OF THE DISCLOSURE

Fuel cell stacks are electrochemical devices that produce water and an electric potential from a fuel, such as a proton source, and an oxidant. Many conventional fuel cell stacks utilize hydrogen gas as the proton source and oxygen gas, air, or oxygen-enriched air as the oxidant. Fuel cell stacks typically include many fuel cells that are fluidly and electrically coupled together between common end plates. Each fuel cell includes an anode region and a cathode region that are separated by an electrolytic membrane. Hydrogen gas is delivered to the anode region, and oxygen gas is delivered to the cathode region. Protons from the hydrogen gas are drawn through the electrolytic membrane to the cathode region, where they react with oxygen to form water. While protons may pass through the membranes, electrons cannot. Instead, the electrons that are liberated from the hydrogen gas travel through an external circuit to form an electric current, which also may be referred to as the electrical output of the fuel cell.

The electrolytic membranes of some fuel cell systems, such as proton exchange membrane (PEM), or solid polymer fuel cell systems, generally need to have a certain level of hydration and to be within a range of suitable operating temperatures in order for the electrolytic membranes to function properly for generation of electrical output. If the membrane is below this range of suitable operating temperatures, the fuel cell will not be able to efficiently produce its electrical output. On the other hand, if the membrane is above this range of suitable temperatures, degradation of the membrane may occur.

During operation of the fuel cell system, a portion of the water for membrane hydration may be generated by the electrochemical reaction of hydrogen and oxygen at the fuel cell cathode. However, additional water is typically required in order to maintain proper membrane hydration. This additional water is often supplied by humidifying the cathode and/or anode gas streams prior to delivery to the fuel cell stack. The relative humidity of these incoming reactant gas streams, which is a ratio of the partial pressure of water in the stream to the vapor pressure of water at the temperature of the stream, impacts the availability of water within the fuel cell stack and thus the hydration of the electrolytic membranes. If too little water is present, the membranes may dry out, leading to a decrease in their proton conductivity, a decrease in their effective area for proton conduction, and/or hot spots that can cause irreversible membrane damage. If too much water is present, the fuel cell stack may flood, leading to a decrease in the availability of reactant gasses to the fuel cell electrodes and a reversible decrease in electrical output.

Conventionally, many fuel cell systems, such as many PEM fuel cell systems, use a humidifier to humidify the cathode air stream that is delivered to the fuel cells of the fuel cell stack, and a stack cooling system that includes a radiator and a coolant pump is used to regulate the temperature and temperature drop of the fuel cell stack by recirculating a heat exchange fluid through the stack in a heat exchange loop. The flow rate of this heat exchange fluid is dictated by the speed of the coolant pump, and the temperature of this heat exchange fluid, which is recirculated through the heat exchange loop, is reduced by the radiator, i.e., by heat exchange with an ambient air stream. In such systems, the humidifier is operated in a feed forward manner to humidify the cathode air stream to a predetermined, or targeted, relative humidity level with respect to the heat exchange fluid that is delivered to the fuel cell stack by the stack cooling system. However, this typically results in the cathode air stream being at a different temperature than the heat exchange fluid that is delivered to the fuel cell stack. This may affect the performance of the fuel cell stack because the membranes of the fuel cells of the fuel cell stack may be at or near the temperature of the heat exchange fluid flowing through the corresponding fuel cells, yet the humidification of the membranes is correlated to the relative humidity of the cathode air stream.

BRIEF DESCRIPTION OF THE DRAWINGS

FIG. 2 is a schematic representation of an individual fuel cell according to the present disclosure.

FIG. 3 is a schematic representation of a fuel cell stack according to the present disclosure.

FIG. 4 is a schematic representation of an oxidant supply system according to the present disclosure.

FIG. 5 is a schematic representation of another example of an oxidant supply system according to the present disclosure.

DETAILED DESCRIPTION AND BEST MODE OF THE DISCLOSURE

Figure 1:
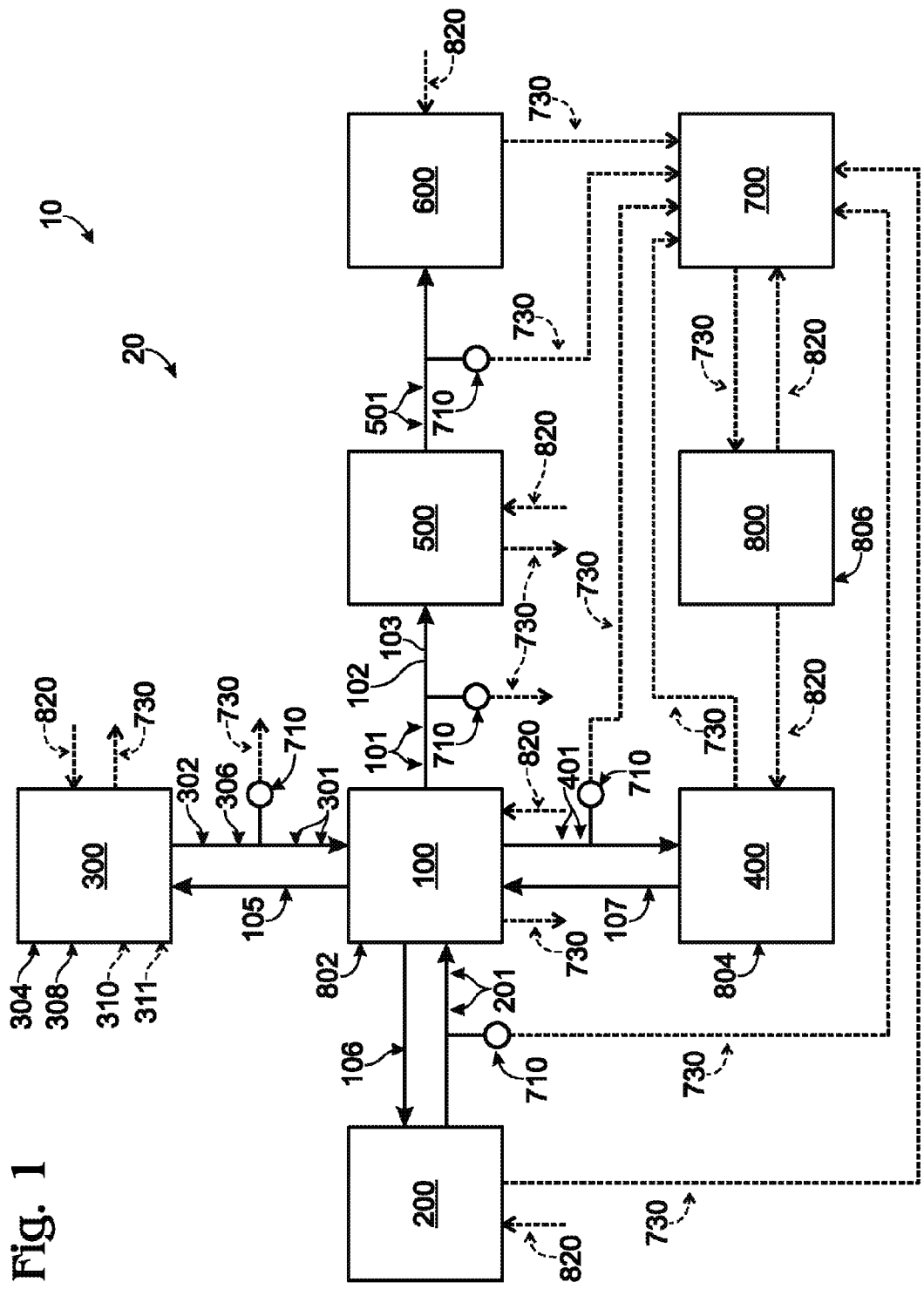
FIG. 1 is a schematic representation of an energy producing and consuming assembly that includes a fuel cell system according to the present disclosure.

An illustrative, non-exclusive example of an energy producing and consuming assembly 10, which includes a fuel cell system 20, according to the present disclosure is schematically shown in FIG. 1. Fuel cell system 20 includes fuel cell assembly 100, oxidant supply system 200, fuel supply system 300, energy delivery system 500, energy consuming/storing assembly 600, sensor and interface system 700, and control system 800. As shown in FIG. 1, fuel cell assembly 100 receives one or more oxidant streams 201 from oxidant supply system 200 and fuel streams 301 from fuel supply system 300. Fuel cell assembly 100 is configured to utilize streams 201 and 301 in an electrochemical reaction to produce fuel cell output 101. Fuel cell output 101 may additionally or alternatively be referred to as the electrical output and/or the energy output of the fuel cell assembly, and it may further additionally or alternatively be referred to as electricity (such as is schematically indicated in FIG. 1 at 102) or as the electrical potential produced by the fuel cell assembly, such as by a fuel cell stack thereof. Fuel cell output 101 may be supplied to energy consuming/storing assembly 600, such as to satisfy an applied load therefrom, through energy delivery system 500. While the fuel cell output is described as the electrical output produced by the fuel cell assembly, additional products of the reaction occurring in the fuel cells of the fuel cell assembly include heat (such as is schematically indicated in FIG. 1 at 103) and water.

Fuel cell system 20 also includes a thermal management system 400. Thermal management system 400 is configured to circulate, or recirculate, a thermal management stream 401 in a heat exchange relationship with the fuel cells in fuel cell assembly 100, such as through the fuel cells, to regulate the temperature of the fuel cells, and thus of the electrolytic membranes of the fuel cells. This regulating of the temperature of the fuel cells, and thus of the electrolytic membranes of the fuel cells, may include (but is not limited to) regulating the temperature level (i.e., the measured or detected temperature of the fuel cells) and/or the temperature drop of the fuel cells (such as the differential temperature between two or more fuel cells of the fuel cell stack and/or between an inlet region of the fuel cell stack and an outlet region of the fuel cell stack). As discussed in more detail herein, thermal management system 400 and oxidant supply system 200 may be regulated, or controlled, to maintain the temperature and humidification of the fuel cells (and membranes thereof) within suitable, or predetermined, ranges. As also discussed in more detail herein, the regulation and/or control may include utilization of at least sensor and interface system 700 and control system 800.

The above referenced systems (200, 300, 400, 500, 600, 700, 800) of a fuel cell system 20 according to the present disclosure have been schematically illustrated in FIG. 1 and may additionally or alternatively be described as corresponding subsystems, assemblies, structures, and/or means. Accordingly, thermal management system 400 may thus additionally or alternatively be referred to as thermal management subsystem 400, thermal management assembly 400, thermal management structure 400, and/or thermal management means 400. These other systems may be referred to herein by the corresponding additional or alternative terms without departing from the scope of the present disclosure. Before discussing in detail the systems and methods for managing fuel cell temperature and humidification according to the present disclosure, these subsystems, and components and interactions therebetween, will be discussed.

As shown in FIG. 1, fuel cell assembly 100 may receive one or more thermal management streams 401 from thermal management system 400, such as to regulate or otherwise control the temperature of fuel cell assembly 100. As an illustrative, non-exclusive example, the thermal management system may be configured, or controlled, to deliver the one or more thermal management streams to the fuel cell assembly to heat the fuel cell assembly to at least a minimum operating temperature, to cool the fuel cell assembly to below a maximum operating temperature, and/or to maintain the fuel cell assembly within a predetermined range of operating temperatures, such as above a minimum operating temperature and below a maximum operating temperature.

The oxidant supply system, fuel supply system, and thermal management system also may receive one or more streams. These streams may include streams, or portions of streams, that originate in one such system, are utilized by the fuel cell stack, and are then received by the same system; streams, or portions of streams, that originate in one such system, are utilized by the fuel cell stack, and are then received by a different system; and/or streams, or portions of streams, that are supplied directly from one such system to another such system. An illustrative, non-exclusive example of a stream that may originate in and be received by the same system is thermal management stream 401. Thermal management system 400 may generate thermal management stream 401 that is delivered to fuel cell assembly 100. After being utilized by fuel cell assembly 100, thermal management stream 401 may be returned to the thermal management system as, or as a portion of, a thermal management return stream 107 for further processing and/or to be recirculated back to the fuel cell assembly.

An illustrative, non-exclusive example of a stream that may originate in one system and be received by a different system is oxidant stream 201. The oxidant supply system may generate oxidant stream 201, which may be utilized in the electrochemical reaction within the fuel cell stack. Upon discharge from the fuel cell stack, the oxidant stream may contain a significant amount of the fluids from incoming streams 201, as well as produced water, a portion of which may be supplied to the fuel supply system as, or as a portion of, fuel return stream 105 to humidify fuel stream 301. Additionally and/or alternatively, a portion of the oxidant stream may be supplied back to the oxidant supply system in oxidant return stream 106 to humidify the incoming oxidant stream, to be recirculated to the fuel cell stack, and/or to receive further processing.

An illustrative, non-exclusive example of a stream that may originate in one system and be supplied directly to another system is fuel stream 301 that originates in fuel supply system 300 and is delivered to fuel cell assembly 100 for use in the electrochemical reaction with the oxidant stream to produce the electrical output of the fuel cell assembly and/or of the fuel cell system. It is within the scope of the present disclosure that fuel supply system 300 includes a fuel processing assembly 308 adapted to generate fuel stream 301 from at least one feedstock stream. It is further within the scope of the present disclosure that fuel processing assembly 308 may include a burner assembly adapted to heat the fuel processing assembly, such as to a hydrogen-producing temperature or temperature range, and/or that the fuel processing assembly may include, or utilize, a hydrogen-producing region that requires an oxidant to generate fuel stream 301. Thus, oxidant stream 201, in the form of a pressurized oxidant stream, may be supplied directly to the burner assembly and/or the hydrogen-producing region.

Fuel cell system 20 may have, and/or may be selectively configured to be in, a plurality of operating states, including but not limited to an idle state, in which the fuel cell system is ready to produce its electrical output but is not currently producing the output; a running state, in which the fuel cell system is producing an electrical output; an off state, in which the fuel cell system is not producing an electrical output and is not ready (i.e., presently configured and available) to produce the electrical output; a startup state, in which the fuel cell system is transitioning from the off state to the idle or running state; a shutdown state, in which the fuel cell system is transitioning from the idle or running state to the off state; and/or an error state, in which the fuel cell system has detected a fault, malfunction, or other error, such as an operating parameter having a value that exceeds a predetermined threshold or range of suitable values. It is not required for all fuel cell systems 20 according to the present disclosure to be selectively configured within all of these operating states. It is further within the scope of the present disclosure that fuel cell systems 20 according to the present disclosure may be selectively configured to, or within, one or more additional operating states.

It is within the scope of the present disclosure that return streams 105, 106, and 107 may have differing compositions depending on the operating state of the fuel cell system. An illustrative, non-exclusive example is the transition between the startup state and the running state. During the startup state, it may be desirable or otherwise necessary to increase the temperature of the fuel cell assembly. To accomplish this, fuel supply system 300 may supply a fuel stream directly to a burner within thermal management system 400 to heat thermal management stream 401 and facilitate heating, and optionally rapid heating, of the fuel cell assembly. Once the fuel cell assembly has reached a threshold operating temperature, such as at least a minimum operating temperature, the fuel cell system may transition from the startup to the running state and/or fuel supply system 300 may discontinue the supply of fuel to the thermal management system.

As shown in FIG. 1, fuel cell system 20 includes sensor and interface system 700. The sensor and interface system includes one or more sensors 710 that are configured to transmit signals 730 indicative of the status of various components of fuel cell system 20. As shown in FIG. 1, the one or more sensors 710 may be configured to monitor streams flowing between the various assemblies of fuel cell system 20, while others may be contained within the various assemblies that make up, or comprise, the fuel cell system. In FIG. 1, sensor and interface system 700 is shown to be in direct communication with oxidant supply system 200, oxidant stream 201, thermal management system 400, thermal management stream 401, energy delivery system electrical output 501, and energy consuming/storing assembly 600. However, it is within the scope of the present disclosure that the sensor and interface system may be configured to collect information from any other system component and/or that it may not collect information from all of the components shown in FIG. 1. This collecting of information may refer to, and/or may include, any suitable method and/or mechanism for measuring values, receiving inputs from sensors, detecting variables and/or changes therein, etc.

Control system 800 may be configured to receive signals 730 from the sensor and interface system that are indicative of the status of the fuel cell system. Control system 800 also may send control signals 820 to the various components of fuel cell system 20, such as to change or otherwise control or regulate the operation thereof. For example, the control system may obtain information or other input signals indicative of the status of a specific system component, such as thermal management system 400, from sensor and interface system 700. Control system 800 also may control the operation of the various system components, such as controlling the operation of thermal management system 400. It is within the scope of the present disclosure that control system 800 may communicate with and/or control other system components and/or that it may not communicate with the specific components shown in FIG. 1.

As discussed, the various systems and assemblies shown in FIG. 1 have been schematically illustrated as individual, discrete systems and assemblies. It is within the scope of the present disclosure that these systems and assemblies may be integrated with one another in any suitable manner. As an illustrative, non-exclusive example, it is within the scope of the present disclosure that at least a portion of sensor and interface system 700 be integral to control system 800. It is also within the scope of the present disclosure that control system 800 may include a controller that interfaces with the various components of fuel cell system 20 and which form a part of the fuel cell system and/or that control system 800 be separate from, or even at a remote location relative to, fuel cell system 20. It is also within the scope of the present disclosure that control system 800 may include a plurality of separate controllers, each controlling various aspects or assemblies of fuel cell system 20, and that they may be separate from and/or integral to the various assemblies of fuel cell system 20. It is further within the scope of the present disclosure that a portion of energy delivery system 500 may be contained within fuel cell assembly 100 and/or energy consuming/storing assembly 600.

As discussed, FIG. 1 is schematically illustrated. As will be evident, the other Figures are also schematically illustrated, with the Figures intended to provide illustrative, but non-exclusive, examples according to the present disclosure, and with the Figures not being intended to limit the scope of the present disclosure to a specific embodiment that is required to all systems and/or methods according to the present disclosure. The Figures are not intended to be drawn to scale, as they have been presented to emphasize and illustrate various aspects of the present disclosure. In the Figures, the same reference numerals designate like and corresponding, but not necessarily identical, elements through the various drawing Figures. Likewise in the Figures and corresponding textual disclosure, previously discussed subject matter and/or reference numerals may be presented in subsequent Figures and/or corresponding textual disclosure without repeating the discussion of such subject matter and/or reference numerals.

As has been mentioned, the present disclosure is directed to methods and systems for controlling the temperature and hydration of a fuel cell stack. As used herein, a fuel cell stack includes one or more fuel cells, whether individually or in groups of fuel cells, and typically includes a plurality of fuel cells coupled between common end plates. The systems and methods disclosed herein are compatible with a variety of different types of fuel cells, such as proton exchange membrane (PEM) fuel cells, alkaline fuel cells, solid oxide fuel cells, molten carbonate fuel cells, phosphoric acid fuel cells, and the like.

For the purpose of illustration, but not limitation, a fuel cell 116 in the form of a PEM fuel cell 116 is schematically illustrated in FIG. 2. The fuel cell may be described as forming a portion of a fuel cell system, such as generally indicated at 20, a portion of fuel cell assembly 100, and/or a portion of a fuel cell stack, such as generally indicated at 104. Proton exchange membrane fuel cells typically utilize a membrane-electrode assembly 118 consisting of an ion exchange, or electrolytic, membrane 118 located between an anode region 122 and a cathode region 124. Each region 122 and 124 includes an electrode 120, namely an anode 126 and a cathode 128, respectively. Each region 122 and 124 also includes a support 130, such as a supporting plate 132. Support 130 may form a portion of the bipolar plate assemblies between the membranes of adjacent fuel cells. The supporting plates 132 of fuel cell 116 may be configured or otherwise utilized to carry the relative voltage potential resulting from the fuel cell reaction, such as in response to the applied load.

In operation, fuel 302 is fed to the anode region from fuel source 304, while oxidant 231 is fed to the cathode region from oxidant source 202. As shown in FIG. 2, oxidant stream 230 optionally may be fed, or delivered, to oxidant conditioning assembly 206 to create a conditioned oxidant stream 232 before being supplied to the cathode region. As an illustrative, non-exclusive example of oxidant conditioning assemblies according to the present disclosure, if oxidant conditioning assembly 206 is an oxidant humidifier 226, conditioned oxidant stream 232 is a humidified oxidant stream 234, which is supplied to the cathode region of the fuel cell. Additionally or alternatively, a fuel conditioning assembly may be included between fuel source 304 and the anode region. Fuel 302 also may be referred to as supply fuel 302. A typical, but not exclusive, fuel for fuel cell 116 is hydrogen, and a typical, but not exclusive, oxidant is oxygen. As used herein, hydrogen refers to hydrogen gas and oxygen refers to oxygen gas. The following discussion may refer to fuel 302 as hydrogen 302 and oxidant 231 as oxygen 231, although it is within the scope of the present disclosure that other fuels and/or oxidants may be used. A suitable source of oxygen gas is air, such as from air proximate the fuel cell system. This air may be referred to herein as ambient air.

Hydrogen 302 and oxygen 231 may be delivered to the respective regions of the fuel cell via any suitable mechanism from respective sources 304 and 202. Illustrative, non-exclusive examples of suitable fuel sources 304 for hydrogen 302 include at least one pressurized tank, hydride bed or other suitable hydrogen storage device, and/or a fuel processor that produces a product, or hydrogen-rich, stream containing hydrogen gas. Illustrative, non-exclusive examples of suitable sources 202 of oxygen 231 include a pressurized tank of oxygen or air, or a fan, compressor, blower, or other device for directing air to the cathode region.

Hydrogen and oxygen combine with one another within the fuel cell via an oxidation-reduction reaction. Although membrane-electrode assembly 118 restricts the passage of a hydrogen molecule, it will permit a hydrogen ion (proton) to pass therethrough, largely due to the ionic conductivity of membrane 118. The catalytic activity of the electrode material lowers the hydrogen dissociation energy, allowing the hydrogen gas to dissociate into protons and free electrons. The ionic potential gradient from the oxidation-reduction reaction at membrane interfaces drives the protons through the ion exchange membrane. As membrane 118 also tends not to be electrically conductive, fuel cell output 101, in the form of a free electron flow, or electricity, 102, flows through energy delivery system 500 via an external circuit 502 to form energy delivery system electrical output 501, which is supplied to energy consuming/storing assembly 600. Also shown in FIG. 2 are an anode purge or exhaust stream 134, which may contain unreacted hydrogen gas, and a cathode purge or exhaust stream 136, which may contain unreacted oxygen gas.

In cathode region 124, electrons from the external circuit and protons from the membrane combine with oxygen to produce water and heat. As discussed herein, the level of hydration of electrolytic membrane 118, which may directly impact the performance of the fuel cell assembly, is influenced by this produced water and heat, as well as by the humidity of the incoming fuel and oxidant streams and the overall temperature of the fuel cell stack. While the amount of heat and electricity produced by the fuel cell stack may be dictated, at least in part, by the power output from the fuel cell system, control of fuel cell stack temperature and/or reactant system water content may enable control of membrane hydration and improve stack lifetime and/or energy production efficiency.

As shown in FIG. 3, a fuel cell stack 104 may contain a plurality of fuel cells 116 with bipolar plate assemblies 133 separating adjacent membrane-electrode assemblies. In this illustrative, but not exclusive, construction, the bipolar plate assemblies are compressed between end plates 138 and permit the free electron to pass from the anode region of a first cell to the cathode region of the adjacent cell via the bipolar plate assembly, thereby establishing an electrical potential through the fuel cell stack. This net flow of electrons produces an electric current that may be used to satisfy an applied load, such as from at least one of an energy-consuming device, an energy-storing device, the fuel cell system itself, and/or the energy-consuming/storing assembly.

The individual fuel cells 116 of fuel cell stack 104 will typically have common, or shared, fuel, oxidant, and thermal management system feeds, as well as common stack purge and exhaust streams, and accordingly will include suitable fluid conduits to deliver the associated streams to, and collect the streams from, the individual fuel cells. These conduits may, but are not required to, be internal to fuel cell stack 104 and may be supplied by external connections to the fuel cell stack, such as anode inlet 140, cathode inlet 144, and fluid inlet 114, which supply fuel 302, oxidant 231, and thermal management fluid 428, respectively. After use within the fuel cell stack, these supplied materials may exit the stack via anode outlet 142, cathode outlet 146, and fluid outlet 112, respectively.

A substantial portion of the heat generated within the fuel cell stack may be removed by thermal management fluid 428, which may then be discharged from the fuel cell system or supplied to thermal management system 400 for conditioning prior to discharge and/or re-use within the fuel cell system. Additionally or alternatively, a portion of thermal management fluid 428 may be utilized to provide a thermal output from the fuel cell stack, which may be used to satisfy a thermal load applied by energy consuming/storing assembly 600.

As discussed herein and shown in FIG. 1, fuel cell assembly 100 may be coupled to fuel supply system 300 that includes a source 304 of fuel 302, such as hydrogen gas 306 (and related delivery systems and balance of plant components). An illustrative, non-exclusive example of a source 304 of hydrogen gas 306 includes a storage device that contains a stored supply of hydrogen gas. Examples of suitable storage devices include tanks, hydride beds, or other suitable pressure vessels and sorption beds containing other hydrogen-adsorbing or absorbing materials such as sodium alanate, carbon nanotubes, or metal-organic polymers. Illustrative, non-exclusive examples of suitable metal hydrides include $LaNi_5$ and other alloys of lanthanum and nickel. The hydride and sorption beds will typically include a pressure vessel that contains the metal hydride or sorbent. If the storage device includes a metal hydride bed, the system may be designed to optimize heat transfer to and from the metal hydride alloy such that heat may be delivered to the hydride bed at a rate sufficient to produce the desired flow rate of hydrogen from the hydride bed and removed from the bed at a rate sufficient to allow for the desired hydrogen sorption rate. Thus, the hydride bed may include optimized heat transfer structures, illustrative, non-exclusive examples of which include, but are not limited to, internal or external fins, metal brushes, water pipes, heat pipes, air tubes, thermal ballast, or other heat transfer means. The sources of heat may include, separately or in combination, electricity (such as in the form of a resistance heater or other electrically powered heat source), fuel cell stack exhaust, reformer exhaust, fuel cell stack coolant, hot air from a cabinet heater, energy stored as heat in the fuel processor or fuel cell system components, or heat from any other suitable source or process.

An additional or alternative illustrative, non-exclusive example of a suitable source 304 of hydrogen gas 306 is the product stream from a fuel processor 308, which produces hydrogen by reacting at least one feed stream, such as a carbon-containing feedstock and/or water, to produce a product stream, such as a mixed gas stream, from which the stream containing hydrogen gas 306 is formed. Illustrative, non-exclusive examples of fuel processors according to the present disclosure include steam reformers (which utilize feed stream(s) containing water and a carbon-containing feedstock), partial oxidation reactors (which utilize feed stream(s) containing air and a carbon-containing feedstock), and autothermal reactors that utilize feed stream(s) containing water, air, and carbon-containing feedstock. Another illustrative, non-exclusive example of a suitable mechanism for producing hydrogen gas includes electrolysis, in which case the feed stream is water. Illustrative, non-exclusive examples of suitable carbon-containing feedstocks include at least one hydrocarbon or alcohol. Illustrative, non-exclusive examples of suitable hydrocarbons include methane, propane, natural gas, diesel, kerosene, gasoline, and the like. Illustrative, non-exclusive examples of suitable alcohols include methanol, ethanol, and polyols, such as ethylene glycol and propylene glycol.

In many applications, it is desirable for the fuel processor to produce at least substantially pure hydrogen gas. Accordingly, fuel processor 308 may include one or more hydrogen producing regions that utilize a process that inherently produces sufficiently pure hydrogen gas, or the fuel processor may include suitable purification and/or separation devices that remove impurities from the hydrogen gas produced in the fuel processor. As another example, the fuel processing system or fuel cell system may include purification and/or separation devices downstream from the fuel processor. In the context of a fuel cell system, the fuel processor may be adapted to produce substantially pure hydrogen gas or even pure hydrogen gas. For the purposes of the present disclosure, substantially pure hydrogen gas is greater than 90% pure, such as greater than 95% pure, greater than 99% pure, or greater than 99.5% pure. Illustrative, non-exclusive examples of suitable fuel processors are disclosed in U.S. Pat. Nos. 6,221,117, 5,997,594, 5,861,137, and pending U.S. Patent Application Publication Nos. 2001/0045061, 2003/0192251, 2003/0167690, 2003/0223926, and 2007/0042247. The complete disclosures of the above-identified patents and patent applications are hereby incorporated by reference.

In the context of a fuel processor generally, a mixed gas stream that contains hydrogen gas as its majority component is produced from the feed stream. The mixed gas stream typically includes other gases as well, which form minority components of the mixed gas stream. Illustrative, non-exclusive examples of these other gases, or impurities, may include one or more of such illustrative impurities as carbon monoxide, carbon dioxide, water, methane, and unreacted carbon-containing feedstock. The mixed gas, or reformate, stream may be delivered to an optional separation region, or purification region, 310, where the hydrogen gas is purified. In the separation region, when present, the hydrogen-containing stream is separated into one or more byproduct streams, which typically include at least a substantial portion of the other gases, and a hydrogen-rich stream, which contains at least substantially pure hydrogen gas. Additionally, or alternatively, the hydrogen-rich stream may be described as containing a greater concentration of hydrogen gas (and/or a lower concentration of the other gases) than the mixed gas stream, and the byproduct stream(s) may be described as containing a greater concentration of the other gases (and/or a lower concentration of hydrogen gas) than the mixed gas stream. The separation region may utilize any suitable separation process, including a pressure-driven separation process. The separation region may form part of the fuel processor or may be configured to receive the reformate stream from the fuel processor.

An illustrative, non-exclusive example of a suitable structure for use in separation region 310 is a membrane module, which contains one or more hydrogen permeable membranes. Examples of suitable membrane modules formed from a plurality of hydrogen-selective metal membranes are disclosed in U.S. Pat. No. 6,319,306, the complete disclosure of which is hereby incorporated by reference. Other illustrative, non-exclusive examples of suitable membranes and membrane modules are disclosed in the above-incorporated patent and also in U.S. Pat. Nos. 6,562,111 and 6,537,352, the complete disclosures of which are hereby incorporated by reference. The membrane(s) may be separate from or integrated directly into the hydrogen-producing region or other portion of fuel processor 308.

The thin, planar, hydrogen-permeable membranes may be composed of palladium alloys, such as palladium with 35 wt % to 45 wt % copper, such as approximately 40 wt % copper. These membranes, which also may be referred to as hydrogen-selective membranes, are typically formed from a thin foil that is approximately 0.001 inches thick. It is within the scope of the present disclosure, however, that the membranes may be formed from hydrogen-selective metals and metal alloys other than those discussed herein, hydrogen-permeable and selective ceramics, polymers, or other carbon compositions. The membranes may have thicknesses that are larger or smaller than discussed herein. For example, the membrane may be made thinner, with commensurate increase in hydrogen flux. The hydrogen-permeable membranes may be arranged in any suitable configuration, such as arranged in pairs around a common permeate channel as is disclosed in the incorporated patents.

Another illustrative, non-exclusive example of a suitable pressure-separation process for use in separation region 310, when present, is pressure swing adsorption (PSA). In a pressure swing adsorption (PSA) process, gaseous impurities are removed from a stream containing hydrogen gas. PSA is based on the principle that certain gases, under the proper conditions of temperature and pressure, will be adsorbed onto an adsorbent material more strongly than other gases. Typically, it is the impurities that are adsorbed and thus removed from the mixed gas stream. The success of using PSA for hydrogen purification is due to the relatively strong adsorption of common impurity gases (such as CO, $CO_2$, hydrocarbons including $CH_4$, and $N_2$) on the adsorbent material. Hydrogen adsorbs only very weakly and so hydrogen passes through the adsorbent bed while the impurities are retained on the adsorbent material. Other impurity gases such as $NH_3$, $H_2S$, and $H_2O$ adsorb very strongly on the adsorbent material and are therefore removed from the mixed gas stream along with other impurities. If the adsorbent material is going to be regenerated and these impurities are present in the mixed gas stream, separation region 310 may include a suitable device that is adapted to remove these impurities prior to delivery of the mixed gas stream to the adsorbent material because it is more difficult to desorb these impurities.

Adsorption of impurity gasses occurs at elevated pressure. When the pressure is reduced, the impurities are desorbed from the adsorbent material, thus regenerating the adsorbent material. Typically, PSA is a cyclic process and requires at least two beds for continuous (as opposed to batch) operation. Examples of suitable adsorbent materials that may be used in adsorbent beds are activated carbon and zeolites, especially 5 Å (5 angstrom) zeolites. The adsorbent material is commonly in the form of pellets and it is placed in a cylindrical pressure vessel utilizing a conventional packed-bed configuration. It should be understood, however, that other suitable adsorbent material compositions, forms, and configurations may be used.

As presented herein, the general operation of a PSA assembly has been somewhat simplified. Illustrative, non-exclusive examples of pressure swing adsorption assemblies, including components thereof and methods of operating the same, are disclosed in U.S. Pat. Nos. 3,564,816, 3,986,849, 4,331,455, 5,441,559, 6,497,856, 6,692,545, 7,160,367, 7,393,382, 7,399,342, 7,416,569, and U.S. Patent Application Publication Nos. 200910151249 and 2009/0151560, the complete disclosures of which are hereby incorporated by reference.

Fuel processor 308 may, but does not necessarily, additionally or alternatively include a polishing region 311. The polishing region may receive the hydrogen-rich stream from separation region 310 and further purify the stream by reducing the concentration of, or removing, selected compositions therein. For example, when the hydrogen-rich stream is intended for use in a fuel cell stack, such as fuel cell stack 104, compositions that may damage the fuel cell stack, such as carbon monoxide and carbon dioxide, may be removed from the hydrogen-rich stream. The concentration of carbon monoxide should be less than 10 ppm (parts per million), with concentrations of less than 5 ppm and less than 1 ppm being common. The concentration of carbon dioxide may be greater than that of carbon monoxide. For example, concentrations of less than 25% carbon dioxide may be acceptable, with concentrations of less than 10%, less than 1%, and less than 50 ppm (0.005%) being common. It should be understood that the acceptable maximum concentrations presented herein are illustrative examples, and that concentrations other than those presented herein may be used and are within the scope of the present disclosure. For example, particular users or manufacturers may require minimum or maximum concentration levels or ranges that are different than those identified herein.

The polishing region, when present, includes any suitable structure for removing or reducing the concentration of the selected compositions in the mixed gas stream. For example, when the product stream is intended for use in a PEM fuel cell stack or other device that may be damaged if the stream contains more than determined concentrations of carbon monoxide or carbon dioxide, it may be desirable to include at least one methanation catalyst bed and/or water gas shift reactor. The methanation catalyst bed converts carbon monoxide and carbon dioxide into methane and water, both of which will not damage a PEM fuel cell stack, while the water gas shift reactor converts carbon monoxide and water into carbon dioxide and hydrogen gas. The polishing region also may include another hydrogen-producing device, such as another reforming catalyst bed, to convert any unreacted feedstock into hydrogen gas. In such an embodiment, the second reforming catalyst bed may be upstream from the methanation catalyst bed or water gas shift reactor so as not to reintroduce carbon dioxide or carbon monoxide into the fuel stream.

It is also within the scope of the present disclosure that a polishing region may be used with fuel processors that do not include a separation region 310. In such an embodiment, the polishing region may receive the reformate stream produced in the hydrogen-producing region of the fuel processor. The polishing region may form part of the fuel processor or may simply be configured to receive the reformate stream from the fuel processor. It is further within the scope of the present disclosure that a fuel supply 300 may include a separation region 310 and/or a polishing region 311 to purify, or remove impurities from, hydrogen gas 306 from a source 304 other than a fuel processor 308, such as from a hydride bed, pressure vessel, or other storage device.

Steam reformers typically operate at temperatures in the range of 200° C. and 800° C., and at pressures in the range of 50 psi and 1000 psi, although temperatures and pressures outside of these ranges are within the scope of the present disclosure, such as depending upon the particular type and configuration of fuel processor being used. Any suitable heating mechanism or device may be used to provide this heat, such as a heater, burner, combustion catalyst, or the like. The heating assembly may be external the fuel processor or may form a combustion chamber that forms part of the fuel processor. The fuel for the heating assembly may be provided by the fuel processing system, by the fuel cell system, by an external source, or any combination thereof.

As discussed herein, fuel cell systems 20 according to the present disclosure may further include an energy delivery system 500. Energy delivery system 500 may include any suitable structure for controlling the delivery of energy from fuel cell assembly 100 to energy consuming/storing assembly 600. This may include structures for controlling the delivery of electrical as well as thermal energy from the fuel cell assembly to the energy consuming/storing device. Energy delivery system 500 may include any suitable number and combination of contactors, solenoids, transistors, switches, DC-DC converters, AC-DC converters, DC-AC inverters, electrical busses, wiring, and/or other connections as well as any other structure necessary or desirable to control the transfer of electrical energy from fuel cell assembly 100 to energy consuming/storing assembly 600. Illustrative, non-exclusive examples of fuel cell systems including energy delivery systems are disclosed in U.S. Pat. Nos. 6,495,277 and 6,835,481, the complete disclosures of which are hereby incorporated by reference.

As discussed herein, energy delivery system 500 also may control the delivery of thermal energy from the fuel cell assembly to the energy consuming device. This may be accomplished by the direct supply of thermal energy from the fuel cell assembly via one or more thermal streams or may be accomplished through the use of thermal management system 400. Energy delivery system 500 may include any suitable structure for controlling the flow of thermal energy between fuel cell assembly 100 and energy consuming/storing assembly 600, such as any number of valves, conduits, pumps, compressors, radiators, heat exchangers, fans, expanders, condensers, orifices, and/or additional structure necessary to affect thermal energy transfer.

An energy producing and consuming assembly, which is illustrated generally in FIG. 1 at 10, includes at least one fuel cell assembly 100 and at least one energy-consuming/storing assembly 600, which is adapted to exert an applied load to, or upon, the fuel cell system, and which also may be referred to herein as a load applying assembly. The at least one energy-consuming/storing assembly 600 may be electrically coupled to the fuel cell, or more typically, the fuel cell stack, either directly or through energy delivery system 500. Energy-consuming/storing assembly 600 applies a load to the cell/stack/system and draws an electric current therefrom to satisfy the load. This load may be referred to as an applied load, and may include thermal and/or electrical load(s). As used herein, the terms "energy-storing/consuming assembly," "energy-storing/consuming device," and "load applying assembly" may be used interchangeably to refer to one or more components adapted to apply a load to the fuel cell, the fuel cell stack, or the fuel cell system.

Figure 8:
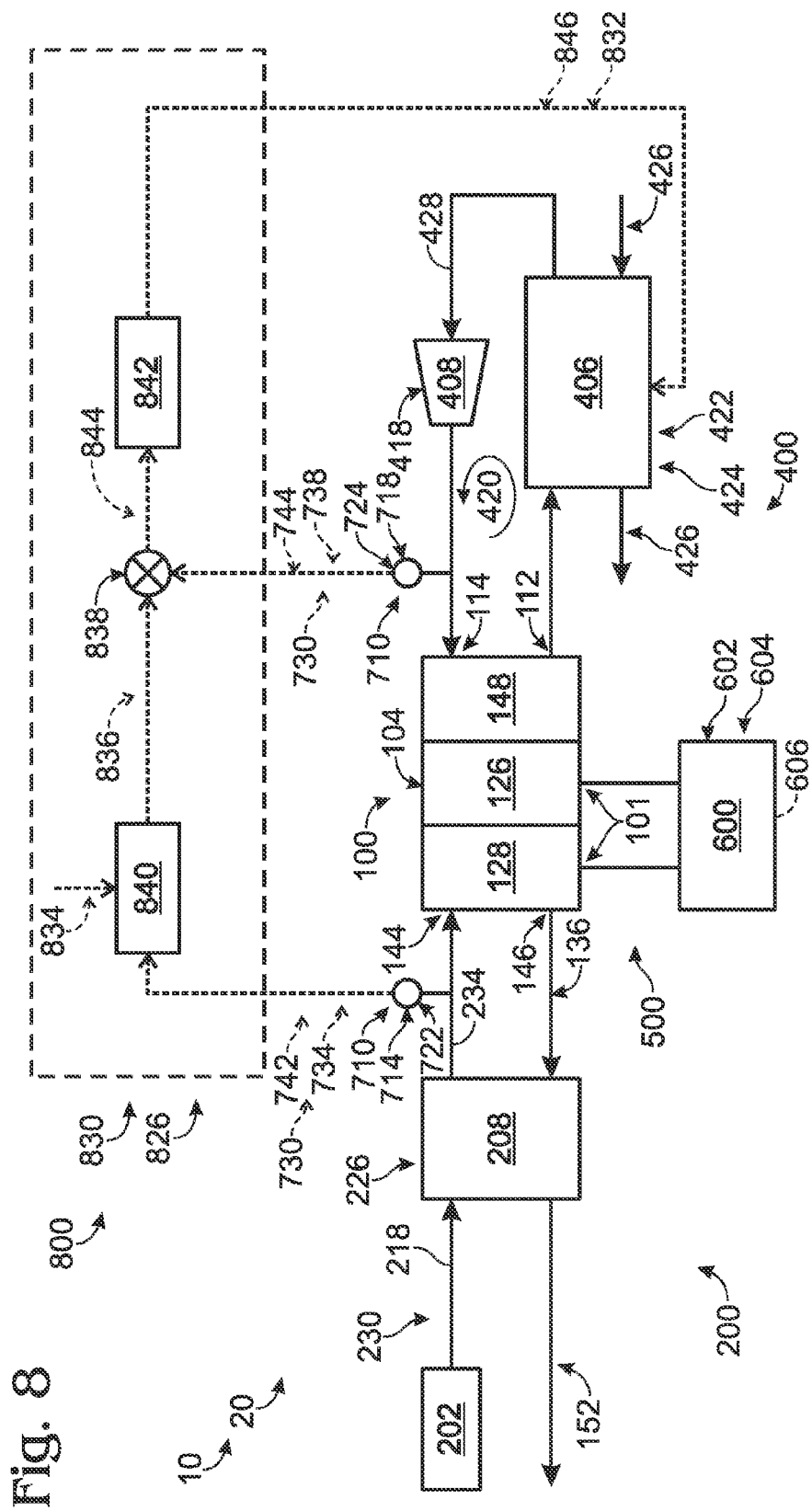
FIG. 8 is a schematic representation of a fuel cell temperature and humidity control system according to the present disclosure.
Figure 9:
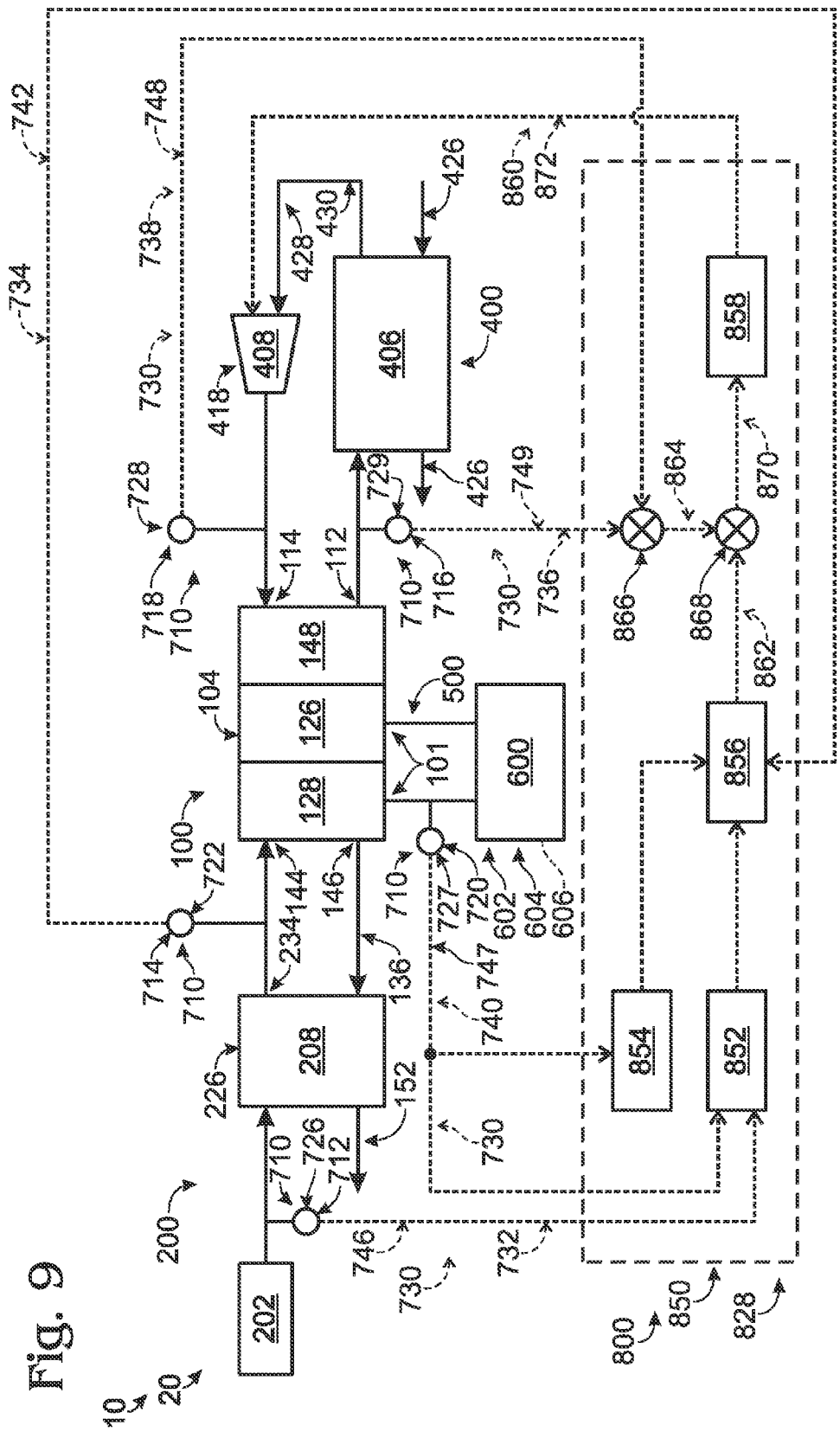
FIG. 9 is a schematic representation of another fuel cell temperature range and humidity control system according to the present disclosure.
Figure 10:
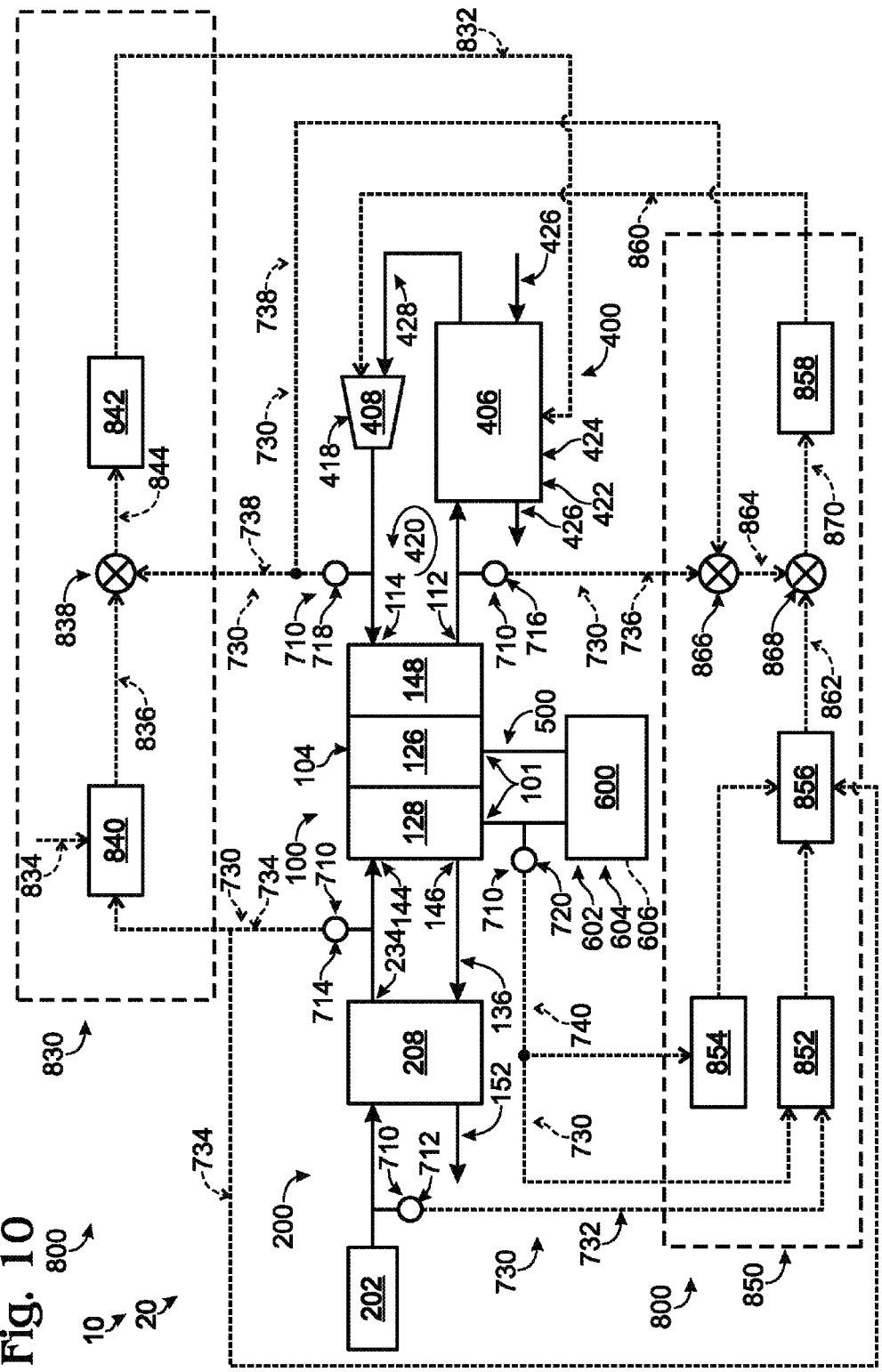
FIG. 10 is a schematic representation of a fuel cell temperature, temperature range, and humidity control system according to the present disclosure.

As schematically illustrated in at least FIGS. 8-10, energy-consuming/storing assembly 600 may include at least one energy-storage device 602. Additionally or alternatively, energy-consuming/storing assembly 600 may include at least one energy-consuming device 604. Illustrative, non-exclusive examples of components that may be, or be included in, energy-storing/consuming, or load applying, assemblies 600 include such energy-consuming devices 604 as motor vehicles, recreational vehicles, boats and other sea craft, and any combination of one or more residences, commercial offices or buildings, neighborhoods, tools, lights and lighting assemblies, appliances, computers, industrial equipment, signaling and communications equipment, and even the balance-of-plant electrical requirements for the fuel cell system of which fuel cell assembly 100 forms a part. Additional illustrative, non-exclusive examples of components that may be, or be included in, energy-storing/consuming, or load-applying, assemblies 600 include such energy storage devices 602 as one or more batteries 606, capacitors, ultracapacitors, and/or flywheels. Load applying assemblies 600 may include additional and/or different components that may be adapted to apply a load to the fuel cell system.

As discussed herein, and with reference again to at least FIG. 1, fuel cell systems 20 according to the present disclosure may further include a sensor and interface system 700 that is adapted to collect information about the various components of the fuel cell system and transmit that information to other system components. Sensor and interface system 700 may include any suitable number of sensors, detectors, sensing elements, meters, and/or transducers 710 adapted to detect a property and/or status of fuel cell system 20 and to transmit that property and/or status via signals 730 to control system 800. Illustrative, non-exclusive examples of system properties that may be detected by system 700 include temperature, pressure, mass flow rate, volumetric flow rate, humidity, chemical composition, electrical current, electrical voltage, and/or electrical power production and/or usage associated with any of the individual components of fuel cell system 20 and/or any of the streams flowing among the components of fuel cell system 20. Illustrative, non-exclusive examples of system status information that may be detected and/or transmitted by system 700 include the operational status, operational state, and/or system errors for the various components and assemblies that make up fuel cell system 20.

In the above discussion of energy producing and consuming assembly 10, the opening and closing of appropriate valves and control of other system hardware, software, and/or other controls may be accomplished via any suitable manner or mechanism. For example, this control may be implemented manually by the user, through the use of a control system 800, or by a combination of the two. Control system 800 may include any suitable type and number of devices or mechanisms to implement and provide for the desired monitoring and/or control of the energy producing and consuming assembly. As illustrative, non-exclusive examples, a suitable controller may take the form of analog or digital circuitry, together with appropriate electronic instructions that may be stored on magnetic media or programmable memory such as read only memory (ROM), programmable read only memory (PROM), or erasable programmable read only memory (EPROM), and may be integrated into the energy producing and consuming assembly or be a separate, stand-alone computing device. The controller may be adapted or otherwise programmed or designed to control the operation of fuel cell system 20 in the plurality of operating states of the system, including optionally controlling transitions of the fuel cell system among the various states. The controller, when present, also may include and/or be in communication with sensor and interface system 700 as detailed herein.

It is also within the scope of the present disclosure that the individual components of the energy producing and consuming assembly may include dedicated or even integrated controllers that are adapted to monitor and/or control the operation of these other components and, where applicable, control the transitions of these components between their respective operating states. As an illustrative, non-exclusive example, the fuel processing assembly and/or the fuel cell assembly may include or be in communication with a controller that is adapted to monitor and/or control the operation thereof, including configuring the assembly and/or system between its operating states.

When the energy producing and consuming assembly includes two or more controllers, the controllers may be in communication with each other. It is also within the scope of the present disclosure that the energy producing and consuming assembly may include a single controller that monitors and/or controls the operation of two or more components thereof, such as the fuel cell assembly and the thermal management system.

A controller that is integrated into and/or otherwise specifically associated with fuel cell assembly 100 is schematically indicated in FIG. 1 at 802, and a controller that is integrated into and/or otherwise specifically associated with thermal management system 400 is schematically indicated in FIG. 1 at 804. For the purpose of completeness, a system controller that is in communication with at least thermal management system 400 and sensor and interface system 700 is indicated at 806. An illustrative example of a fuel cell controller is disclosed in U.S. Pat. No. 6,495,277, the complete disclosure of which is hereby incorporated by reference.

As discussed herein, fuel cell systems 20 according to the present disclosure may include an oxidant supply system 200 to supply an oxidant stream to fuel cell assembly 100. An illustrative, non-exclusive example of oxidant supply systems according to the present disclosure is shown in FIG. 4. As shown in FIG. 4, oxidant supply system 200 includes an oxidant source 202, which may be any source or supply of a suitable oxidant. An illustrative, non-exclusive example of a suitable oxidant is oxygen gas. Illustrative, non-exclusive examples of suitable oxidant sources or supplies include pressurized tanks containing gaseous or liquid oxidant, atmospheric air, and/or atmospheric air that has undergone processing to increase, decrease, or otherwise change its oxygen content. An illustrative, non-exclusive example of an oxidant supply system is disclosed in U.S. Patent Application Publication No. 2004/0197616, the complete disclosure of which is hereby incorporated by reference.

Depending on the nature of the oxidant source, oxidant from oxidant source 202 may be supplied to an oxidant drive assembly 204. If oxidant source 202 includes a non-pressurized source of oxidant, such as atmospheric air, drive assembly 204 may serve to increase the pressure of oxidant stream 230 and/or provide a motive force for the flow of oxidant stream 230 through the oxidant supply system and the fuel cell stack by creating a pressurized oxidant stream 236. Alternatively, if oxidant source 202 includes a pressurized oxidant source, oxidant drive assembly 204 may serve to regulate the flow of oxidant from the oxidant source. Illustrative, non-exclusive examples of oxidant drive assemblies 204 according to the present disclosure include any suitable pump, fan, compressor, blower, venturi, ejector, mass flow controller, orifice, pressure regulator, flow regulating device, valve, or combination of these devices that is capable of delivering and/or regulating the flow of oxidant within the oxidant supply system.

As shown in FIG. 4, pressurized oxidant stream 236 may be supplied to an oxidant conditioning assembly 206 to produce a conditioned oxidant stream 232. Oxidant conditioning assembly 206 may include any suitable structure for modifying the temperature, pressure, and/or chemical composition of the oxidant stream. Illustrative, non-exclusive examples of oxidant conditioning assemblies according to the present disclosure include heaters, coolers, and/or other equipment that may serve to increase or decrease the temperature of the oxidant stream, purification assemblies, such as filters, membrane and/or sorption-based separation assemblies that may serve to increase the concentration of certain chemical components and/or decrease the concentration of other components in the oxidant stream, and/or augmentation assemblies, such as humidifiers, humidification exchangers, and other humidification equipment that may serve to add or remove certain chemical species, such as water, to the oxidant stream.

Conditioned oxidant stream 232 also may be supplied to cross-stream oxidant conditioning assembly 208 before being supplied to cathode 128. Cross-stream oxidant conditioning assembly 208 may permit or otherwise provide for mass and/or energy transfer between oxidant stream 230 and another stream, such as cathode exhaust stream 136 or any other available supplementary stream 214. Illustrative, non-exclusive examples of cross-stream oxidant conditioning assemblies 208 according to the present disclosure include radiators, heat exchangers, and/or other equipment that places two or more streams in thermal contact, as well as enthalpy wheels, humidification assemblies, and/or related equipment that places two or more streams in thermal contact and permits mass transfer between the streams.

Upon exiting cathode 128, all or a portion of cathode exhaust stream 136 may be supplied to cross-stream conditioning assembly 208 as detailed herein, supplied to a cathode exhaust conditioning assembly 212 for further processing, supplied to another assembly within the fuel cell system, recirculated back to oxidant stream 230 via cathode exhaust recirculation stream 213, and/or discharged from the system. Cathode exhaust conditioning assembly 212 may recover a portion of cathode exhaust stream 136 for later use within the fuel cell system and/or may further prepare cathode exhaust stream 136 for use in another assembly within the fuel cell system, recirculation, and/or discharge. An illustrative, non-exclusive example of cathode exhaust conditioning assemblies according to the present disclosure includes an intercooler-condenser assembly adapted to remove water from the cathode exhaust stream prior to discharge. This water may be re-used within fuel cell system 20.

While the components of oxidant supply system 200 are show in FIG. 4 in a specific order, it is within the scope of the present disclosure that they may be assembled in any suitable manner and/or order. Thus, the individual components may be rearranged, duplicated, and/or omitted without departing from the scope of the present disclosure. In addition, and as shown in FIG. 4, oxidant supply system 200 may include any number of sensors 710, both internal to the various components of the oxidant supply system and monitoring the streams flowing among the various components. These sensors may produce signals 730, as described herein, indicative of the status of the oxidant supply system. The components of oxidant supply system 200 may further include internal controllers and/or may receive control signals 820 from a control system 800, such as control system 800 that is discussed herein and which was shown in FIG. 1.

Another illustrative, non-exclusive example of an oxidant supply system 200 according to the present disclosure is shown in FIG. 5. In FIG. 5, oxidant 231 in the form of atmospheric air 218 from oxidant source 202 is supplied to oxidant conditioning assembly 206 in the form of a particulate filter 220 to produce a filtered oxidant stream 238. The flow rate of the filtered oxidant stream is measured by sensor 710 in the form of oxidant flow sensor 712. A signal 730, which is indicative of the flow rate of oxidant 732, is supplied, such as via sensor and interface system 700 to control system 800 which were shown in FIG. 1. The filtered oxidant stream is then compressed by oxidant drive assembly 204 in the form of a compressor 222 to produce pressurized oxidant stream 236. The temperature of the pressurized oxidant stream optionally may be adjusted in a second oxidant conditioning assembly 206 in the form of oxidant cooler 224 before being supplied to cross-stream oxidant conditioning assembly 208 in the form of oxidant humidifier 226. The temperature of the resultant humidified oxidant stream 234 is measured using temperature sensor 714 before the stream is supplied to cathode 128. The temperature of the humidified oxidant stream is supplied to control system 800 via signal 734. Cathode exhaust stream 136 is supplied to humidifier 226 to provide a heated and humidified incoming oxidant stream 230. The cathode exhaust stream may further flow through cathode exhaust conditioning assembly 212 in the form of intercooler-condenser 228 to produce a dried cathode exhaust stream 152 before being discharged from the fuel cell system.

Figure 6:
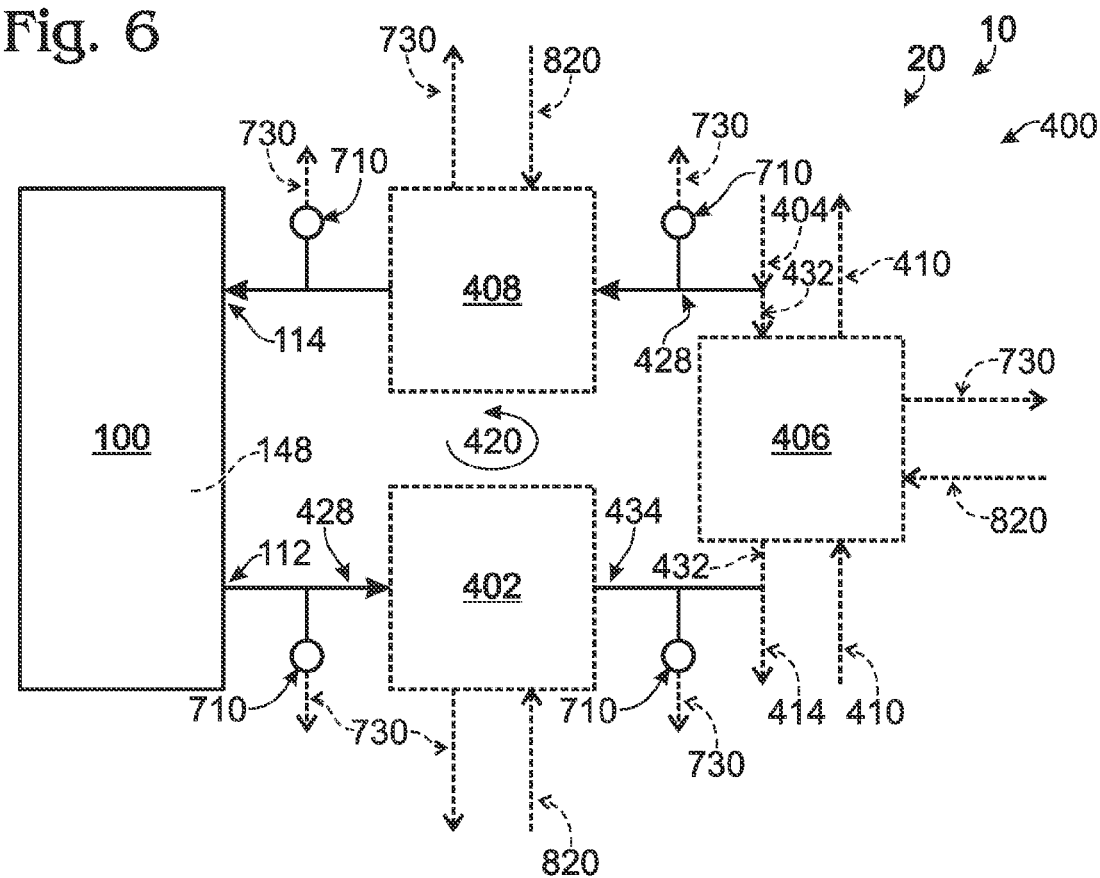
FIG. 6 is a schematic representation of a thermal management system according to the present disclosure.

As has been mentioned, systems and methods according to the present disclosure may utilize thermal management system 400 to control the temperature (such as the temperature level and/or the temperature drop) of the fuel cell assembly. Thermal management system 400 may include any suitable structure for controlling the temperature of fuel cell assembly 100 and/or any other component of fuel cell system 20. An illustrative, non-exclusive example of thermal management system 400 according to the present disclosure is shown in FIG. 6. In FIG. 6, thermal management fluid 428 flows from thermal management fluid source 404 to fluid inlet 114, through fuel cell stack 100, such as to at least a fuel cell stack heat exchange portion 148 thereof, to fluid outlet 112, and finally to thermal management fluid sink 414. Alternatively, a portion of the thermal management fluid may flow through recirculation conduit 432 to form a thermal management fluid recirculation loop 420, which has been schematically represented with an arcuate lead line in FIG. 6. Illustrative, non-exclusive examples of a suitable thermal management fluid source include a coolant capacitor and expansion tank, but others may be utilized.

Thermal management system 400 may further include one or more optional components. For example, thermal management fluid 428 may be supplied to thermal management fluid conditioning assembly 402, to produce a conditioned thermal management fluid stream 434. Thermal management fluid conditioning assembly 402 may include any structure for modifying the temperature, pressure, and/or chemical composition of the thermal management fluid. Illustrative, non-exclusive examples of thermal management fluid conditioning assemblies according to the present disclosure include heaters, coolers, and/or other equipment that may serve to increase or decrease the temperature of the thermal management fluid, purification assemblies, such as filters, that may serve to remove contaminants from the thermal management fluid, purification and/or augmentation assemblies that may serve to change the chemical composition of the thermal management fluid, and/or evaporators, condensers, and/or expansion valves that may serve to change the phase of the thermal management fluid.

Thermal management fluid 428 may further be supplied to a cross-stream thermal management fluid conditioning assembly 406. Cross-stream conditioning assembly 406 may allow mass and/or energy transfer between the thermal management fluid and a supplementary stream 410. Illustrative, non-exclusive examples of cross-stream conditioning assemblies 406 according to the present disclosure include radiators, heat exchangers, and/or other equipment that places two or more streams in heat exchange relationship.

The thermal management fluid also may be supplied to a thermal management fluid drive assembly 408 which may serve to increase the pressure of the thermal management fluid, regulate the flow of the thermal management fluid, and/or propel the thermal management fluid through fuel cell assembly 100. Illustrative, non-exclusive examples of thermal management fluid drive assemblies 408 according to the present disclosure include any suitable pump, fan, compressor, blower, venturi, ejector, mass flow controller, orifice, pressure regulator, flow regulating device, valve, and/or combination of devices that are capable of delivering and/or regulating the flow of thermal management fluid within the thermal management system.

While the components of thermal management system 400 are shown in FIG. 6 in a specific order, it is within the scope of the present disclosure that they may be assembled in any suitable manner. Thus, the individual components may be rearranged, duplicated, and/or omitted without departing from the scope of the present disclosure. In addition, and as shown in FIG. 6, thermal management system 400 may include any number of sensors 710, both internal to the various components of the thermal management system and monitoring the streams flowing among the various components. These sensors produce signals 730, as described herein, indicative of the status of the thermal management system. The components of thermal management system 400 may further include internal controllers to control their operation and/or they may receive control signals 820 from control system 800.

As discussed herein, thermal management system 400 may utilize any suitable mechanism to control the temperature of fuel cell assembly 100. This may include active temperature control methodologies that employ pumps, valves, and/or electronic controllers to direct the flow of thermal management fluid as well as passive temperature control methodologies that rely on the thermodynamic properties of the thermal management fluid, the ambient environment, and/or other system components to provide the desired temperature control. When a thermal management fluid is supplied to fuel cell assembly 100, such as to fuel cell stack thereof, it may be supplied to the external surface of the fuel cell stack and/or internal to the fuel cell stack. If the thermal management fluid is supplied internal to the fuel cell stack, it may be supplied to internally segregated regions of the fuel cell stack that are designed to accept the thermal management fluid, such as fuel cell stack heat exchange portion 148, and/or it may be supplied directly to the anode and/or cathode regions of the fuel cell stack. Illustrative examples of fuel cell stack thermal management systems are disclosed in U.S. Pat. No. 6,376,113 and U.S. Patent Application Publication No. 2007/0042247, the complete disclosures of which are hereby incorporated by reference.

Thermal management fluid 428 may be any suitable fluid whose thermodynamic properties, availability, and/or chemical characteristics make it suitable for use in the thermal management system. Illustrative, non-exclusive examples of thermal management fluids according to the present disclosure include gasses such as air, the previously discussed fuel stream (301), the previously discussed oxidant stream (230), and/or liquids such as water, other non-conducting and non-corrosive liquids including ethylene glycol and propylene glycol, and/or refrigerants such as fluorocarbons, ammonia, sulfur dioxide, and methane.

Figure 7:
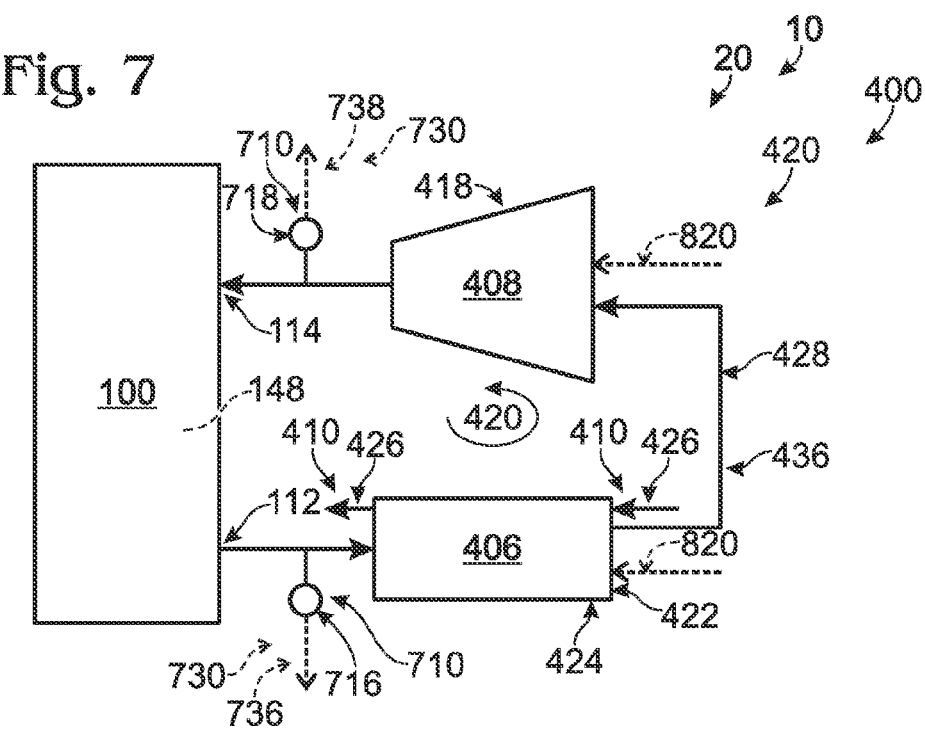
FIG. 7 is a schematic representation of another example of a thermal management system according to the present disclosure.

Another illustrative, non-exclusive example of a thermal management system 400 according to the present disclosure is shown in FIG. 7. In FIG. 7, thermal management fluid 428 is supplied in a thermal management fluid recirculation loop 420 from a fluid outlet 112 to a fluid inlet 114. Thermal management fluid 428 exits the fuel cell assembly 100 at fluid outlet 112 and its temperature is measured using sensor 710 in the form of fluid outlet temperature sensor 716. Sensor 716 generates a fluid outlet temperature signal 736, which is indicative of the temperature of the thermal management fluid at the outlet of the fuel cell stack, and transmits the signal to control system 800. The thermal management fluid next travels to cross-stream thermal management fluid conditioning assembly 406, which comprises a radiator 422 and a fan 424, where it exchanges thermal energy with and is cooled by air stream 426 to produce a cooled thermal management fluid stream 436. The cooled thermal management fluid stream is then supplied to thermal management fluid drive assembly 408 in the form of pump 418, which increases the pressure of the thermal management fluid and provides a driving force for circulation through fuel cell assembly 100. Upon exiting pump 418, the temperature of the thermal management fluid is once again measured using fluid inlet temperature sensor 718 and a signal 738, indicative of the temperature of the thermal management fluid at the inlet to the fuel cell assembly, is transmitted to control system 800. The thermal management fluid then enters fuel cell assembly 100 through fluid inlet 114. The operation of assemblies 406 and 408, or alternatively fan 424 and pump 418, may be controlled by any suitable mechanism, including by one or more of the control signals (820) disclosed herein.

As discussed herein, the level of hydration of the electrolytic membrane used in PEM fuel cells may directly impact the electrical performance of the fuel cell and/or fuel cell stack. Thus, careful control of membrane hydration, which may be accomplished through control of fuel cell stack temperature and temperature difference (differential) and/or reactant gas humidification levels, may be desirable in order to improve the operational characteristics of the fuel cell stack. Illustrative, non-exclusive examples of fuel cell stack temperatures, which additionally or alternatively may be referred to as fuel cell stack operating temperatures or operating temperature ranges, include temperatures in the range of 40-80° C., 50-70° C., 55-65° C., or 59-61° C., such as temperatures of 50° C., 55° C., 60° C., 65° C., or 70° C. Often, 100% relative humidity (RH) may be desirable at the inlet to the fuel cell stack; however, kinetic limitations and humidifier hardware size constraints may dictate or otherwise result in the use of reactant streams with slightly lower humidity levels, such as humidity levels in the range of 60-98% RH, 70-95% RH, or 80-90% RH. In order to ensure adequate membrane hydration, it is customary to control the system such that the % RH (relative humidity percent) of cathode exhaust stream 136 (such as is illustrated in FIG. 2) is near or even slightly greater than 100% RH. Illustrative, non-exclusive examples of target cathode exhaust humidity levels include relative humidities 80-120% RH, such as humidities of 90% RH, 95% RH, 100% RH, 105% RH, 110% RH, or 115% RH.

Historically, and as discussed, fuel cell stack temperature and membrane hydration control has been accomplished by utilizing a feedback control loop within the thermal management system to maintain the temperature of the fuel cell stack substantially equal to a setpoint value. Additionally, a feedforward control loop has been utilized to maintain the humidity of the oxidant and/or fuel streams at a desired level and thus provide the desired degree of membrane hydration within the fuel cell stack. This approach provides for temperature control of the fuel cell stack; however, reactant gas stream humidity control, and thus membrane hydration control, is challenging due to the passive nature of humidifying equipment. In addition, responding to changes in ambient environmental conditions such as temperature, pressure, and humidity often requires environmental monitoring equipment and mathematical modeling of the relationship between the environmental variables and the fuel cell system, increasing the complexity and cost as well as decreasing the accuracy of this hydration control methodology. Illustrative, non-exclusive examples of humidity and hydration control systems and methods are disclosed in U.S. Patent Application Publication Nos. 2008/0299420 and 2008/0299423, the complete disclosures of which are hereby incorporated by reference.

Several methods and systems for the control of fuel cell stack temperature and electrolytic membrane hydration within the scope of the present disclosure are presented herein in conjunction with FIGS. 8-10. In FIG. 8, oxidant supply system 200 and thermal management system 400 are substantially similar to the systems described in FIGS. 4-7.

In a general sense, the system of FIG. 8 controls a variable associated with the thermal management system based at least in part on a variable associated with the oxidant supply system. In FIG. 8, oxidant supply system sensor 722 detects a variable associated with the oxidant supply system and sends a signal 742 to controller 826. In addition, thermal management system sensor 724 detects a variable associated with the thermal management system and sends a signal 744 to controller 826. Based on the values of signals 742 and 744, controller 826 generates thermal management system control signal 846, which controls the operation of at least a portion of the thermal management system to control the value of the variable associated with the thermal management system.

Illustrative, non-exclusive examples of variables associated with the oxidant supply system include the temperature of the oxidant stream, the pressure of the oxidant stream, the flow rate of the oxidant stream, the humidity of the oxidant stream, and/or the chemical composition of the oxidant stream. Illustrative, non-exclusive examples of variables associated with the thermal management system include the temperature of the thermal management fluid, the pressure of the thermal management fluid, the flow rate of the thermal management fluid, and/or the chemical composition of the thermal management fluid. Illustrative, non-exclusive examples of portions of the thermal management system that may be controlled by control signal 846 include the thermal management fluid conditioning assembly, the cross-stream thermal management fluid conditioning assembly, and/or the thermal management fluid drive assembly. Illustrative, non-exclusive examples of these assemblies are discussed herein.

In a specific example, the temperature and hydration control system and method of FIG. 8 utilizes a temperature control feedback loop in the form of controller 830 to control the temperature of the thermal management fluid based on the temperature of the oxidant stream entering the fuel cell stack cathode. Oxidant from oxidant source 202 is supplied to cross-stream oxidant conditioning assembly 208 in the form of oxidant humidifier 226 to produce humidified oxidant stream 234. Oxidant temperature sensor 714 measures the temperature of the incoming oxidant stream and supplies this information (i.e., the measured value or parameter), via oxidant temperature signal 734, to temperature estimator 840. Responsive to receipt of temperature signal 734 and a setpoint signal 834, such as which may be a parameter and/or which may be provided by another control mechanism or loop, temperature estimator 840 generates an output signal 836 that corresponds to the desired temperature of the fuel cell stack. Output signal 836 is supplied to temperature control loop comparator 838. Additionally, fluid inlet temperature sensor 718 measures the temperature of the thermal management fluid at the inlet to the fuel cell stack and supplies this information, via fluid inlet temperature signal 738, to temperature control loop comparator 838. Comparator 838 compares the desired temperature 836 and the actual temperature 738 of the thermal management fluid and generates a temperature difference signal 844 indicative of the difference between the desired coolant temperature and the actual coolant temperature at the entrance to the fuel cell stack.

Difference signal 844 is supplied to a fan speed controller 842, which generates a fan speed control signal 832 to control the speed of fan 424. Accordingly, if the actual temperature of the thermal management fluid is greater than the desired temperature, then the fan speed may be increased to thereby increase the cooling of the thermal management fluid and thereby decrease temperature difference. Similarly, if the actual temperature is less than the desired temperature, the fan speed may be decreased to thereby decrease the cooling of the thermal management fluid and thereby increase the temperature of the thermal management fluid to similarly decrease the temperature difference. It follows then that changes in the temperature of the thermal management fluid result in a corresponding change in the cooling provided thereby to the fuel cell stack, which in turn may affect the temperature of the fuel cells within the fuel cell stack.

As detailed herein, thermal management system 400 includes radiator 422 and fan 424 that may control the velocity of an air stream 426 that is in thermal communication with the radiator and thus in thermal communication with thermal management fluid 428. Fan speed control signal 832 may control the velocity of air stream 426 and the rate of thermal energy transfer between thermal management fluid 428 and air stream 426. Thus, feedback loop 830 may control the temperature of thermal management fluid 428 as measured by sensor 718 at fluid inlet 114.

Setpoint signal 834 may be related to the desired % RH of the oxidant stream within the fuel cell stack. A variety of mathematical equations exist that may be used to relate the relative humidity of a water-air mixture at one temperature to the relative humidity of the same water-air mixture at a different temperature, such as the Clausius-Clapeyron and Antoine equations. Thus, temperature estimator 840 may calculate a desired fuel cell temperature based on the temperature and relative humidity (which may be measured or assumed) of the humidified oxidant stream and the desired relative humidity within the fuel cell stack. In practice, since the % RH of the humidified oxidant stream may be approximately 80-90% RH, the temperature of the thermal management fluid at the inlet to the fuel cell stack may be controlled to be approximately equal to the temperature of the humidified oxidant stream, such as to within (i.e., ±) 10° C., 8° C., 6° C., 5° C., 3° C., or 1° C. of the temperature of the humidified oxidant stream.

As discussed herein, other temperature and hydration control systems and methods are within the scope of the present disclosure. For instance, FIG. 9 provides an illustrative, non-exclusive example of a membrane hydration control method and system according to the present disclosure that in a general sense, controls a relationship between two variables associated with the thermal management system based at least in part on at least one variable, and in some embodiments, two variables associated with the oxidant supply system and a variable associated with the energy produced by the fuel cell stack. Once again, oxidant supply system 200 and thermal management system 400 are substantially similar to the systems described in FIGS. 4-7.

In FIG. 9, thermal management system sensors 728 and 729 generate signals 748 and 749 indicative of two variables associated with the thermal management system and supply signals 748 and 749 to controller 828. In addition, oxidant supply system sensors 722 and 726, as well as fuel cell energy output sensor 727 generate signals 742, 746, and 747, indicative of two variables associated with the oxidant supply system and a variable associated with the fuel cell energy output, respectively, and supply signals 742, 746, and 747 to controller 828. Based on the above signals, controller 828 generates thermal management control signal 872, which controls the operation of at least a portion of the thermal management system to control a relationship between the variables associated with the thermal management system.

Illustrative, non-exclusive examples of variables associated with the thermal management system and variables associated with the oxidant supply system, together with portions of the thermal management system that may be controlled by control signal 872 are detailed herein. Illustrative, non-exclusive examples of a variable associated with the fuel cell energy output include the electrical current generated by the fuel cell stack, the electrical voltage generated by the fuel cell stack, the electrical power generated by the fuel cell stack, and/or the heat energy generated by the fuel cell stack. Illustrative, non-exclusive examples of relationships between the variables associated with the thermal management system include any suitable relationship between the variables, such as the average, difference, ratio, and/or other mathematical expression that describes one variable as a function of the other.

In a specific example, the temperature and hydration control system and method of FIG. 9 utilizes a feedback loop to control the difference in the temperature of the thermal management fluid at the inlet and the outlet of the fuel cell stack by controlling the flow rate of the thermal management fluid based upon the flow rate of the oxidant stream, the temperature of the oxidant stream, and the electrical current produced by the fuel cell stack. Control system 800, in the form of temperature differential feedback loop 850, controls the flow rate of thermal management fluid within the thermal management system by controlling the speed of pump 418.

In FIG. 9, the flow rate of oxidant from oxidant source 202 is measured using oxidant flow sensor 712 and supplied, via oxidant flow signal 732, to stoichiometry calculator 852. In addition, the current output from the fuel cell stack is measured using electrical output sensor 720 and supplied, via electrical output signal 740, to the stoichiometry calculator. The stoichiometry calculator utilizes the flow rate and current output signals to calculate the stoichiometry of the electrochemical reaction within the fuel cell stack and thus the amount of water and gas in cathode exhaust stream 136. Electrical output signal 740 is also supplied to Ev calculator 854, which calculates the desired fraction of water generated in the cathode by the electrochemical reaction that is vaporized in the cathode at the given output current level. The temperature of the oxidant stream is measured using oxidant temperature sensor 714 and supplied, via oxidant temperature signal 734, to target temperature difference calculator 856 along with the outputs from stoichiometry calculator 852 and By calculator 854. Target temperature difference calculator 856 calculates a target difference 862 in the temperature of the thermal management fluid between fluid inlet 114 and fluid outlet 112. The actual temperatures are measured by sensors 716 and 718 and transmitted to comparator 866 via signals 736 and 738, respectively, to calculate the actual temperature difference 864. Target temperature difference 862 is compared to actual temperature difference 864 at comparator 868 to generate temperature difference error signal 870, which is supplied to pump speed controller 858. Speed controller 858 then generates pump speed control signal 860, which is supplied to pump 418 to control the speed of the pump. An increase in the speed of pump 418 will result in an increase in the flow rate of thermal management fluid 428 through fuel cell stack 104 of fuel cell assembly 100 and a decrease in the difference in temperature of the thermal management fluid between the inlet and the outlet of the fuel cell stack. Conversely, a decrease in the speed of pump 418 will result in a decrease in the flow rate of thermal management fluid 428 through fuel cell stack 104 and an increase in the difference in temperature of the thermal management fluid between the inlet and the outlet of the fuel cell stack.

Both the general and the more specific temperature and hydration control systems and methods detailed herein with respect to FIGS. 8 and 9 may be combined to create hybrid temperature and hydration control systems and methods that may control both a variable associated with the thermal management system and the relationship between two variables associated with the thermal management system by controlling the operation of the thermal management system based on one or more variables associated with the oxidant supply system and a variable associated with the energy produced by the fuel cell stack. FIG. 10 provides an illustrative, non-exclusive example of a combined temperature and temperature differential control system and method according to the present disclosure. In FIG. 10, oxidant supply system 200 and thermal management system 400 are once again substantially similar to the systems described in FIGS. 4-7. In addition, temperature control feedback loop 830 and temperature differential feedback loop 850 are substantially similar to the control systems described in FIGS. 8 and 9, respectively. Feedback loop 830 is used to control the speed of fan 424, and thus the rate of thermal energy removal from the fuel cell stack. In addition, feedback loop 850 is used to control the speed of pump 418, and thus the temperature differential across the fuel cell stack, such as described herein.

As discussed herein, both water and heat are generated when hydrogen and oxygen combine at the fuel cell cathode. Thus, both the temperature and the amount of water will increase as the oxidant stream flows through the fuel cell stack. This parallel increase in both water content and temperature may be beneficial to stack operation, as it may help to maintain electrolytic membrane hydration levels; however, if the temperature and hydration are not carefully controlled, the fuel cell may experience "hot spots," which lead to membrane dehydration and decreased stack performance. Independent control of both the average fuel cell temperature (via feedback loop 830) and the range of temperatures within the fuel cell stack (via feedback loop 850) may provide a thermal management system that may maintain precise control of membrane hydration levels across the entire fuel cell stack.

As discussed herein, FIGS. 8-10 provide illustrative, non-exclusive examples of specific embodiments of control systems and methods for controlling temperature and hydration within a fuel cell system. Numerous variations are possible without departing from the scope of the present disclosure. For example, and as discussed herein with reference to FIGS. 1-7, the specific components that form or otherwise make up the individual systems contained within energy producing and consuming assembly 10 may vary. In addition, the type, number, and/or location of any sensors utilized in the control systems and methods detailed herein may vary. Also, additional and/or alternative control strategies may be employed. For example, thermal management system 400 may be adapted to maintain the temperature of thermal management fluid 428 at fluid outlet 112 below a threshold value; thermal management system 400 may be utilized to heat fuel cell assembly 100 at startup and/or under low temperature ambient conditions; and/or a humidity sensor may be utilized in conjunction with oxidant temperature sensor 714 to detect both the temperature and the humidity of the incoming oxidant stream and supply this information to control system 800. In addition, while the above systems and methods have been presented in the context of humidifying the oxidant stream and/or controlling based on the oxidant stream, they are applicable to the fuel stream. Accordingly, use of the systems and methods disclosed herein to humidify and/or control the temperature of a fuel stream to a fuel cell stack are also within the scope of the present disclosure.

Illustrative, non-exclusive examples of systems and methods according to the present disclosure are presented in the following enumerated paragraphs. It is within the scope of the present disclosure that the individual aspects or steps of the methods recited herein, including in the following enumerated paragraphs, may additionally or alternatively be referred to as a "step for" performing the recited action.

A1. A method of operating a fuel cell system that is adapted to supply an electrical output to an energy consuming device and which comprises a fuel cell stack adapted to produce the electrical output, an energy delivery system adapted to supply the electrical output to the energy consuming device, a thermal management system adapted to regulate the temperature of the fuel cell stack, a fuel supply system adapted to supply fuel to the fuel cell stack, an oxidant supply system adapted to supply oxidant to the fuel cell stack, a sensor system adapted to detect a status of the fuel cell system, and a control system adapted to control operation of the fuel cell system, the method comprising:

supplying a fuel stream from the fuel supply system to the fuel cell stack;

supplying an oxidant stream from the oxidant supply system to the fuel cell stack;

producing an electrical output from the fuel cell stack;

supplying a thermal management fluid from the thermal management system to the fuel cell stack;

detecting a variable associated with the oxidant stream;

detecting a variable associated with the thermal management fluid; and controlling the variable associated with the thermal management fluid based at least in part on the variable associated with the oxidant stream.

A2. The method of paragraph A1, wherein supplying the oxidant stream further comprises supplying the oxidant stream to an oxidant conditioning assembly to produce a conditioned oxidant stream and supplying the conditioned oxidant stream to the fuel cell stack.

A3. The method of paragraph A2, wherein detecting the variable associated with the oxidant stream includes detecting a temperature associated with the conditioned oxidant stream.

A4. The method of paragraph A2 or A3, wherein the oxidant conditioning assembly includes an oxidant humidifier and further wherein the conditioned oxidant stream is a humidified oxidant stream.

A5. The method of any of paragraphs A1-A4, wherein supplying the thermal management fluid further includes supplying the thermal management fluid in a thermal management fluid recirculation loop from a fuel cell stack fluid outlet to a fuel cell stack fluid inlet.

A6. The method of paragraph A5, wherein the thermal management fluid recirculation loop further includes a thermal management fluid conditioning assembly and further wherein controlling the variable associated with the thermal management fluid includes controlling heat transfer from the thermal management fluid by the thermal management fluid conditioning assembly to control a temperature associated with the thermal management fluid.

A7. The method of paragraph A6, wherein the thermal management fluid conditioning assembly includes a radiator and a fan, and the method further comprises flowing the thermal management fluid within the radiator, propelling an air stream in heat exchange relationship with the radiator, and exchanging thermal energy between the thermal management fluid and the air stream, A8. The method of paragraph A7, wherein controlling the heat transfer from the thermal management fluid by the thermal management fluid conditioning assembly comprises controlling a velocity of the air stream in heat exchange relationship with the radiator by controlling a speed of the fan.

A9. The method of any of paragraphs A6-A8, wherein the temperature associated with the thermal management fluid is a fluid inlet temperature associated with the thermal management fluid at the fuel cell stack fluid inlet, detecting the variable associated with the thermal management fluid includes detecting the fluid inlet temperature, and further wherein controlling the temperature associated with the thermal management fluid includes controlling the fluid inlet temperature responsive to the variable associated with the oxidant stream.

A10. The method of paragraph A9, wherein the variable associated with the oxidant stream is an oxidant inlet temperature associated with the oxidant stream at a fuel cell stack oxidant inlet, and further wherein detecting a variable associated with the oxidant stream includes detecting the oxidant inlet temperature.

A11. The method of paragraph A10, wherein controlling the fluid inlet temperature includes utilizing a feedback loop to control the fluid inlet temperature to correspond to the oxidant inlet temperature.

A12. The method of paragraph A11, wherein controlling the fluid inlet temperature to correspond to the oxidant inlet temperature includes controlling the difference between the fluid inlet temperature and the oxidant inlet temperature.

A13. The method of paragraph A12, wherein controlling the difference between the fluid inlet temperature and the oxidant inlet temperature includes minimizing the difference between the fluid inlet temperature and the oxidant inlet temperature.

A14. The method of paragraph A11, wherein controlling the fluid inlet temperature to correspond to the oxidant inlet temperature includes controlling the fluid inlet temperature to be within 5° C., and optionally within 1-5 C, of the oxidant inlet temperature.

A15. The method of any of paragraphs A5-A14, wherein detecting a variable associated with the oxidant stream includes detecting a first variable associated with the oxidant stream and detecting a second variable associated with the oxidant stream, wherein the first variable associated with the oxidant stream includes a flow rate of the oxidant stream, the second variable associated with the oxidant stream includes an oxidant inlet temperature associated with the oxidant stream at a fuel cell stack inlet, and the method further includes detecting a magnitude of the electrical output supplied to the energy consuming device.

A16. The method of paragraph A15, wherein detecting the variable associated with the thermal management fluid includes detecting a fluid inlet temperature associated with the thermal management fluid at the fuel cell stack fluid inlet and detecting a fluid outlet temperature associated with the thermal management fluid at the fuel cell stack fluid outlet, and further wherein controlling the variable associated with the thermal management fluid includes controlling a relationship between the fluid inlet temperature and the fluid outlet temperature based at least in part on the flow rate of the oxidant stream, the oxidant inlet temperature, and the magnitude of the electrical output from the fuel cell stack.

A17. The method of paragraph A16, wherein controlling the relationship between the fluid inlet temperature and the fluid outlet temperature includes controlling the difference between the fluid inlet temperature and the fluid outlet temperature.

A18. The method of paragraph A16 or A17, wherein the thermal management fluid recirculation loop further includes a thermal management fluid drive assembly adapted to control the flow rate of the thermal management fluid within the thermal management fluid recirculation loop, and further wherein controlling the relationship between the fluid inlet temperature and the fluid outlet temperature includes controlling the flow rate of the thermal management fluid within the thermal management fluid recirculation loop by controlling the thermal management fluid drive assembly.

A19. The method of paragraph A18, wherein controlling the relationship between the fluid inlet temperature and the fluid outlet temperature includes controlling the difference between the fluid inlet temperature and the fluid outlet temperature.

A20. The method of paragraph A19, further comprising determining a stoichiometry of an electrochemical reaction within the fuel cell based on the flow rate of the oxidant stream and the magnitude of the electrical output supplied to the energy consuming device and controlling the difference between the fluid inlet temperature and the fluid outlet temperature based on the stoichiometry.

A21. The method of paragraph A20, further comprising calculating a target difference between the fluid inlet temperature and the fluid outlet temperature based on the stoichiometry, the oxidant inlet temperature, and a target fraction of water generated within the fuel cell that is vaporized within the fuel cell and controlling the difference between the fluid inlet temperature and the fluid outlet temperature based on the target difference.

A22. The method of paragraph A21, wherein the thermal management fluid is a liquid, the thermal management fluid drive assembly includes a pump, and further wherein controlling the thermal management fluid drive assembly includes controlling the speed of the pump.

A23. The method of paragraph A21 or A22, wherein controlling the difference between the fluid inlet temperature and the fluid outlet temperature includes utilizing a feedback loop to control the difference between the fluid inlet temperature and the fluid outlet temperature to correspond to the target difference.

A24. The method of paragraph A23, wherein controlling the difference between the fluid inlet temperature and the fluid outlet temperature includes controlling the fluid outlet temperature to be less than a threshold fluid outlet temperature.

A25. The method of any of paragraphs A1-A24, wherein the fuel cell stack contains a plurality of proton exchange membrane fuel cells.

A26. The method of any of paragraphs A1-A25, wherein the method includes producing the fuel stream with a fuel processor.

A27. The method of any of paragraphs A1-A26, wherein the method includes supplying the electrical output to the energy consuming device.

A28. The method of paragraph A27, wherein the energy consuming device includes telecommunications equipment.

A29. The method of any of paragraphs A1-A28, wherein the method includes storing at least a portion of the electrical output.

A30. The method of paragraph A29, wherein the method includes recharging at least one battery with the electrical output.

B1. A fuel cell system, comprising:
a fuel cell stack adapted to produce an electrical output and supply the electrical output to an energy consuming device;
a thermal management system adapted to supply a thermal management fluid to the fuel cell stack to regulate the temperature of the fuel cell stack;
a fuel supply system adapted to supply a fuel stream to the fuel cell stack;
an oxidant supply system adapted to supply an oxidant stream to the fuel cell stack;
a fluid sensor adapted to detect a variable associated with the thermal management fluid;
an oxidant sensor adapted to detect a variable associated with the oxidant supply system; and
a control system adapted to control the variable associated with the thermal management fluid based at least in part on the variable associated with the oxidant supply system.

B2. The system of paragraph B1, wherein the oxidant supply system further includes an oxidant conditioning assembly adapted to accept the oxidant stream and produce a conditioned oxidant stream, which is supplied to the fuel cell stack.

B3. The system of paragraph B2, wherein the variable associated with the oxidant supply system is a temperature associated with the conditioned oxidant stream.

B4. The system of paragraph B2 or B3, wherein the oxidant conditioning assembly includes a humidifier and further wherein the conditioned oxidant stream is a humidified oxidant stream.

B5. The system of any of paragraphs B1-B4, wherein the thermal management system includes a thermal management fluid recirculation loop adapted to circulate the thermal management fluid between a fuel cell stack fluid outlet and a fuel cell stack fluid inlet.

B6. The system of paragraph B5, wherein the thermal management fluid recirculation loop further includes a thermal management fluid conditioning assembly, the variable associated with the thermal management fluid is a temperature associated with the thermal management fluid, and further wherein the control system is adapted to control a heat transfer from the thermal management fluid by the thermal management fluid conditioning assembly to control the temperature associated with the thermal management fluid.

B7. The system of paragraph B6, wherein the thermal management fluid conditioning assembly includes a radiator in heat exchange relationship with at least the thermal management fluid and an air stream, and further wherein the thermal management fluid conditioning assembly includes a fan adapted to propel the air stream in heat exchange relationship with the radiator.

B8. The system of paragraph B7, wherein the control system is adapted to control the temperature associated with the thermal management fluid by controlling a speed of the fan.

B9. The system of any of paragraphs B6-B8, wherein the temperature associated with the thermal management fluid is a fluid inlet temperature associated with the thermal management fluid at the fuel cell stack fluid inlet, and further wherein the control system is adapted to control the fluid inlet temperature responsive to the variable associated with the oxidant stream.

B10. The system of paragraph B9, wherein the variable associated with the oxidant stream is an oxidant inlet temperature associated with the oxidant stream at the fuel cell stack oxidant inlet.

B11. The system of paragraph B10, wherein the control system utilizes a feedback loop to control the fluid inlet temperature to correspond to the oxidant inlet temperature.

B12. The system of paragraph B10, wherein the control system utilizes a feedback loop to control the difference between the fluid inlet temperature and the oxidant inlet temperature.

B13. The system of paragraph B10, wherein the control system utilizes a feedback loop to minimize the difference between the fluid inlet temperature and the oxidant inlet temperature.

B14. The system of paragraphs B11-B13, wherein the control system is configured to utilize a feedback loop to maintain the fluid inlet temperature within 5° C., and optionally within 1-5° C., of the oxidant inlet temperature.

B15. The system of any of paragraphs B5-B14, wherein the oxidant sensor is a first oxidant sensor adapted to detect a flow rate of the oxidant stream, the system includes an electrical sensor adapted to detect a magnitude of the electrical output from the fuel cell stack, and the system further includes a second oxidant sensor adapted to detect an oxidant inlet temperature associated with the oxidant stream at the fuel cell stack inlet.

B16. The system of paragraph B15, wherein the fluid sensor is a first fluid sensor adapted to detect a first variable associated with the thermal management fluid, the system further includes a second sensor adapted to detect a second variable associated with the thermal management fluid, and further wherein the control system is adapted to control the relationship between the first variable associated with the thermal management fluid and the second variable associated with the thermal management fluid based at least in part on the flow rate of the oxidant stream, the magnitude of the electrical output from the fuel cell stack, and the oxidant inlet temperature.

B17. The system of paragraph B16, wherein the first variable associated with the thermal management fluid is a fluid inlet temperature associated with the thermal management fluid at the fuel cell stack inlet, the second variable associated with the thermal management fluid is a fluid outlet temperature associated with the thermal management fluid at the fuel cell stack outlet, and further wherein the control system is adapted to control the difference between the fluid inlet temperature and the fluid outlet temperature responsive to the flow rate of the oxidant stream, the magnitude of the electrical output from the fuel cell stack, and the oxidant inlet temperature.

B18. The system of paragraph B16 or B17, wherein the thermal management fluid recirculation loop further includes a thermal management fluid drive assembly adapted to control the flow rate of the thermal management fluid within the thermal management fluid recirculation loop, and further wherein the control system is adapted to control the relationship between the fluid inlet temperature and the fluid outlet temperature by controlling the thermal management fluid drive assembly.

B19. The system of paragraph B18, wherein the control system is adapted to control the difference between the fluid inlet temperature and the fluid outlet temperature by controlling the thermal management fluid drive assembly.

B20. The system of paragraph B19, wherein the control system determines a stoichiometry of an electrochemical reaction within the fuel cell based on the flow rate of the oxidant stream and the magnitude of the electrical output supplied to the energy consuming device, and further wherein the control system controls the difference between the fluid inlet temperature and the fluid outlet temperature based on the stoichiometry.

B21. The system of paragraph B20, wherein the control system calculates a target difference between the fluid inlet temperature and the fluid outlet temperature based on the stoichiometry, a target fraction of water generated within the fuel cell that is vaporized within the fuel cell, and the oxidant inlet temperature, and further wherein the control system controls the difference between the fluid inlet temperature and the fluid outlet temperature based on the target difference.

B22. The system of paragraph B21, wherein the thermal management fluid is a liquid, the thermal management fluid drive assembly includes a pump, and further wherein the control system is adapted to control the thermal management fluid drive assembly by controlling the speed of the pump.

B23. The system of paragraph B21 or B22, wherein the control system utilizes a feedback loop to control the difference between the fluid inlet temperature and the fluid outlet temperature based on the target difference.

B24. The system of paragraph B23, wherein the control system further controls the fluid outlet temperature to be less than a threshold fluid outlet temperature.

B25. The use of the system of any of paragraphs B1-B24 to control the temperature and humidity of a fuel cell stack.

B26. The use of the methods of any of paragraphs A1-A30 to control the temperature and humidity of a fuel cell stack.

B27. The systems of any of paragraphs B1-B24 configured to utilize the methods of paragraphs A1-A30.

B28. The us of the methods of any of paragraphs A1-A30 in the systems of any of paragraphs B1-B24.

C1. A fuel cell system, comprising:
a fuel cell stack adapted to produce an electrical output and supply the electrical output to an energy consuming device;
a thermal management system adapted to supply a thermal management fluid to the fuel cell stack to control the temperature of the fuel cell stack;
a fuel supply system adapted to supply a fuel stream to the fuel cell stack;
an oxidant supply system adapted to supply an oxidant stream to the fuel cell stack;
means for detecting a variable associated with the thermal management fluid;
means for detecting a variable associated with the oxidant supply system; and
means for controlling the variable associated with the thermal management fluid based at least in part on the variable associated with the oxidant supply system.

C2. The fuel cell system of paragraph C1, wherein the means for detecting a variable associated with the thermal management fluid includes a means for detecting a first variable associated with the thermal management fluid and a means for detecting a second variable associated with the thermal management fluid, the means for detecting a variable associated with the oxidant supply system includes a means for detecting a first variable associated with the oxidant supply system and a means for detecting a second variable associated with the oxidant supply system, the fuel cell system further includes a means for detecting a variable associated with the electrical output, and further wherein the means for controlling includes a first means for controlling the first variable associated with the thermal management fluid based at least in part on the first variable associated with the oxidant supply system and a second means for controlling a relationship between the first variable associated with the thermal management fluid and the second variable associated with the thermal management fluid based at least in part on the first variable associated with the oxidant supply system, the second variable associated with the oxidant supply system, and the variable associated with the electrical output.

C3. The fuel cell system of paragraph C2, wherein the first variable associated with the thermal management fluid includes a fluid inlet temperature associated with the thermal management fluid at a fluid inlet to the fuel cell stack, the second variable associated with the thermal management fluid includes a fluid outlet temperature associated with the thermal management fluid at a fluid outlet from the fuel cell stack, the first variable associated with the oxidant supply system includes an oxidant inlet temperature associated with the oxidant stream at an oxidant inlet to the fuel cell stack, the second variable associated with the oxidant supply system includes an oxidant flow rate, and the variable associated with the electrical output of the fuel cell stack includes the electrical current generated by the fuel cell stack.

INDUSTRIAL APPLICABILITY

The disclosed fuel cell temperature and membrane hydration control systems and methods are applicable to fuel cells and other industries in which temperature and hydration controls are important.

In the event that any of the references that are incorporated by reference herein define a term in a manner or are otherwise inconsistent with either the non-incorporated disclosure of the present application or with any of the other incorporated references, the non-incorporated disclosure of the present application shall control and the term or terms as used therein only control with respect to the patent document in which the term or terms are defined.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A method of operating a fuel cell system that is configured to supply an electrical output to an energy consuming device and which comprises a fuel cell stack configured to produce the electrical output, an energy delivery system configured to supply the electrical output to the energy consuming device, a thermal management system configured to regulate the temperature of the fuel cell stack, a fuel supply system configured to supply fuel to the fuel cell stack, an oxidant supply system configured to supply oxidant to the fuel cell stack, a sensor system configured to detect a status of the fuel cell system, and a control system configured to control operation of the fuel cell system, the method comprising:
   supplying a feedstock stream to a fuel processing assembly of the fuel supply system;
   generating a mixed gas stream, which includes hydrogen gas and other gasses, from the feedstock stream within the fuel processing assembly;
   purifying the mixed gas stream within a separation region of the fuel supply system to generate a byproduct stream, which includes a greater concentration of the other gasses than the mixed gas stream, and a fuel stream, which includes a greater concentration of hydrogen gas than the mixed gas stream;
   supplying the fuel stream from the fuel supply system to the fuel cell stack;
   supplying an oxidant stream from the oxidant supply system to the fuel cell stack;
   producing the electrical output from the fuel cell stack;
   supplying a thermal management fluid from the thermal management system and from a fuel cell stack fluid outlet to a fuel cell stack fluid inlet in a thermal management fluid recirculation loop, wherein the thermal management fluid recirculation loop includes a thermal management fluid conditioning assembly;
   detecting a variable associated with the oxidant stream, wherein the variable associated with the oxidant stream is an oxidant inlet temperature associated with the oxidant stream at a fuel cell stack oxidant inlet;
   detecting a temperature associated with the thermal management fluid; and
   controlling the temperature associated with the thermal management fluid based at least in part on the variable associated with the oxidant stream by controlling a heat transfer from the thermal management fluid by the thermal management fluid conditioning assembly.

2. The method of claim 1, wherein supplying the oxidant stream further comprises supplying the oxidant stream to an oxidant conditioning assembly to produce a conditioned oxidant stream and supplying the conditioned oxidant stream to the fuel cell stack, wherein detecting the variable associated with the oxidant stream includes detecting a temperature associated with the conditioned oxidant stream, wherein the oxidant conditioning assembly includes an oxidant humidifier, and further wherein the conditioned oxidant stream is a humidified oxidant stream.

3. The method of claim 1, wherein the thermal management fluid conditioning assembly includes a radiator and a fan, and the method further comprises flowing the thermal management fluid within the radiator, propelling an air stream in heat exchange relationship with the radiator, and exchanging thermal energy between the thermal management fluid and the air stream, and further wherein controlling the heat transfer from the thermal management fluid by the thermal management fluid conditioning assembly comprises controlling a velocity of the air stream in heat exchange relationship with the radiator by controlling a speed of the fan.

4. The method of claim 1, wherein the temperature associated with the thermal management fluid is a fluid inlet temperature associated with the thermal management fluid at the fuel cell stack fluid inlet, detecting the temperature associated with the thermal management fluid includes detecting the fluid inlet temperature, and further wherein controlling the temperature associated with the thermal management fluid includes controlling the fluid inlet temperature responsive to the variable associated with the oxidant stream.

5. The method of claim 4, wherein controlling the fluid inlet temperature includes utilizing a feedback loop to control the fluid inlet temperature to correspond to the oxidant inlet temperature.

6. The method of claim 5, wherein controlling the fluid inlet temperature to correspond to the oxidant inlet temperature includes controlling the difference between the fluid inlet temperature and the oxidant inlet temperature.

7. The method of claim 5, wherein controlling the fluid inlet temperature to correspond to the oxidant inlet temperature includes controlling the fluid inlet temperature to be within 5° C. of the oxidant inlet temperature.

8. The method of claim 1, wherein detecting the variable associated with the oxidant stream includes detecting a flow rate of the oxidant stream and an inlet temperature of the oxidant stream associated with the oxidant stream at an inlet to the fuel cell stack, wherein the method further includes detecting a magnitude of the electrical output supplied to the energy consuming device, wherein detecting the temperature associated with the thermal management fluid includes detecting a fluid inlet temperature associated with the thermal management fluid at the fuel cell stack fluid inlet and detecting a fluid outlet temperature associated with the thermal management fluid at the fuel cell stack fluid outlet, and further wherein controlling the temperature associated with the thermal management fluid includes controlling a relationship between the fluid inlet temperature and the fluid outlet temperature based at least in part on the flow rate of the oxidant stream, the inlet temperature of the oxidant stream, and the magnitude of the electrical output from the fuel cell stack.

9. The method of claim 8, wherein controlling the relationship between the fluid inlet temperature and the fluid outlet temperature includes controlling the difference between the fluid inlet temperature and the fluid outlet temperature.

10. The method of claim 8, wherein the thermal management fluid recirculation loop further includes a thermal management fluid drive assembly configured to control the flow rate of the thermal management fluid within the thermal management fluid recirculation loop, and further wherein controlling the relationship between the fluid inlet temperature and the fluid outlet temperature includes controlling the flow rate of the thermal management fluid within the thermal management fluid recirculation loop by controlling the thermal management fluid drive assembly.

11. The method of claim 10, wherein controlling the relationship between the fluid inlet temperature and the fluid outlet temperature includes controlling the difference between the fluid inlet temperature and the fluid outlet temperature.

12. The method of claim 11, further comprising determining a stoichiometry of an electrochemical reaction within the fuel cell stack based on the flow rate of the oxidant stream and the magnitude of the electrical output supplied to the energy consuming device and controlling the difference between the fluid inlet temperature and the fluid outlet temperature based on the stoichiometry.

13. The method of claim 12, further comprising calculating a target difference between the fluid inlet temperature and the fluid outlet temperature based on the stoichiometry, the inlet temperature of the oxidant stream, and a target fraction of water generated within the fuel cell stack that is vaporized within the fuel cell stack, and controlling the difference between the fluid inlet temperature and the fluid outlet temperature based on the target difference, wherein the thermal management fluid is a liquid, the thermal management fluid drive assembly includes a pump, and further wherein controlling the thermal management fluid drive assembly includes controlling the speed of the pump.

14. The method of claim 12, wherein controlling the difference between the fluid inlet temperature and the fluid outlet temperature includes utilizing a feedback loop to control the difference between the fluid inlet temperature and the fluid outlet temperature to correspond to the target difference.

15. The method of claim 14, wherein controlling the difference between the fluid inlet temperature and the fluid outlet temperature includes controlling the fluid outlet temperature to be less than a threshold fluid outlet temperature.

16. A fuel cell system, comprising:
a fuel processing assembly that is configured to receive a feedstock stream and to generate a mixed gas stream, which includes hydrogen gas and other gasses, therefrom;
a separation region that is configured to receive the mixed gas stream and to produce a fuel stream, which includes a greater concentration of hydrogen gas than the mixed gas stream, and a byproduct stream, which includes a greater concentration of the other gasses than the mixed gas stream, therefrom;
a fuel cell stack that is configured to receive the fuel stream, to produce an electrical output from the fuel stream, and to supply the electrical output to an energy consuming device;
a thermal management system configured to supply a thermal management fluid to the fuel cell stack to regulate the temperature of the fuel cell stack, wherein the thermal management system includes:
a thermal management fluid recirculation loop configured to circulate the thermal management fluid between a fuel cell stack fluid outlet and a fuel cell stack fluid inlet;
a radiator that is in heat exchange relationship with the thermal management fluid and an air stream; and
a fan that is configured to propel the air stream in heat exchange relationship with the radiator;
a fuel supply system configured to supply a fuel stream to the fuel cell stack;
an oxidant supply system including a humidifier that is configured to supply a humidified oxidant stream to the fuel cell stack;
a fluid sensor configured to detect a temperature associated with the thermal management fluid;
an oxidant sensor configured to detect a temperature associated with the humidified oxidant stream, wherein the temperature associated with the humidified oxidant stream is an oxidant inlet temperature associated with the humidified oxidant stream at a fuel cell stack oxidant inlet; and
a control system programmed to control the temperature associated with the thermal management fluid based at least in part on the oxidant inlet temperature by controlling a speed of the fan.

17. The system of claim 16, wherein the temperature associated with the thermal management fluid is a fluid inlet temperature associated with the thermal management fluid at the fuel cell stack fluid inlet, and further wherein the control system is programmed to utilize a feedback loop to control the fluid inlet temperature to correspond to the oxidant inlet temperature.

18. The system of claim 16, wherein the oxidant sensor is a first oxidant sensor configured to detect an oxidant inlet temperature associated with the humidified oxidant stream at the fuel cell stack oxidant inlet and the system includes a second oxidant sensor configured to detect a flow rate associated with the humidified oxidant stream, wherein the system further includes an electrical sensor configured to detect a magnitude of the electrical output from the fuel cell stack, wherein the fluid sensor is a first fluid sensor configured to detect a fluid inlet temperature associated with the thermal management fluid at the fuel cell stack fluid inlet, wherein the system further includes a second fluid sensor configured to detect a fluid outlet temperature associated with the thermal management fluid at the fuel cell stack fluid outlet, and further wherein the control system is programmed to control a difference between the fluid inlet temperature and the fluid outlet temperature responsive to the flow rate of the oxidant stream, the oxidant inlet temperature, and the magnitude of the electrical output from the fuel cell stack.

19. The system of claim 18, wherein the thermal management fluid recirculation loop further includes a thermal management fluid drive assembly configured to control a flow rate of the thermal management fluid within the thermal management fluid recirculation loop, and further wherein the control system is programmed to control the difference between the fluid inlet temperature and the fluid outlet temperature by controlling the thermal management fluid drive assembly.

20. The system of claim 19, wherein the control system determines a stoichiometry of an electrochemical reaction within the fuel cell stack based on the flow rate of the oxidant stream and the magnitude of the electrical output supplied to the energy consuming device, and further wherein the control system controls the difference between the fluid inlet temperature and the fluid outlet temperature based on the stoichiometry, the magnitude of the electrical output from the fuel cell stack, and the oxidant inlet temperature.

21. A fuel cell system, comprising:
a fuel processing assembly that is configured to receive a feedstock stream and to generate a mixed gas stream, which includes hydrogen gas and other gasses, therefrom;
a separation region that is configured to receive the mixed gas stream and to produce a fuel stream, which includes a greater concentration of hydrogen gas than the mixed gas stream, and a byproduct stream, which includes a greater concentration of the other gasses than the mixed gas stream, therefrom;
a fuel cell stack that is configured to receive the fuel stream, to produce an electrical output from the fuel stream, and to supply the electrical output to an energy consuming device;
a thermal management system configured to supply a thermal management fluid to the fuel cell stack to control the temperature of the fuel cell stack;
a fuel supply system configured to supply a fuel stream to the fuel cell stack;
an oxidant supply system configured to supply an oxidant stream to the fuel cell stack;
means for detecting a variable associated with the thermal management fluid;
means for detecting a variable associated with the oxidant supply system, wherein the variable associated with the oxidant supply system is an oxidant inlet temperature associated with the oxidant stream at an oxidant inlet to the fuel cell stack; and
means for controlling the variable associated with the thermal management fluid based at least in part on the oxidant inlet temperature.

22. The fuel cell system of claim 21, wherein the means for detecting a variable associated with the thermal management fluid includes a means for detecting a first variable associated with the thermal management fluid and a means for detecting a second variable associated with the thermal management fluid, the means for detecting a variable associated with the oxidant supply system includes a means for detecting a first variable associated with the oxidant supply system and a means for detecting a second variable associated with the oxidant supply system, the fuel cell system further includes a means for detecting a variable associated with the electrical output, and further wherein the means for controlling includes a first means for controlling the first variable associated with the thermal management fluid based at least in part on the first variable associated with the oxidant supply system and a second means for controlling a relationship between the first variable associated with the thermal management fluid and the second variable associated with the thermal management fluid based at least in part on the first variable associated with the oxidant supply system, the second variable associated with the oxidant supply system, and the variable associated with the electrical output.

23. The fuel cell system of claim 22, wherein the first variable associated with the thermal management fluid includes a fluid inlet temperature associated with the thermal management fluid at a fluid inlet to the fuel cell stack, the second variable associated with the thermal management fluid includes a fluid outlet temperature associated with the thermal management fluid at a fluid outlet from the fuel cell stack, the first variable associated with the oxidant supply system includes the oxidant inlet temperature associated with the oxidant stream at the oxidant inlet to the fuel cell stack, the second variable associated with the oxidant supply system includes an oxidant flow rate, and the variable associated with the electrical output of the fuel cell stack includes the electrical output generated by the fuel cell stack.

24. A fuel cell system, comprising:
a fuel cell stack configured to supply an electrical output to an energy consuming device;
a thermal management system configured to supply a thermal management fluid to the fuel cell stack to regulate the temperature of the fuel cell stack;
a fuel supply system configured to supply a fuel stream to the fuel cell stack;
an oxidant supply system configured to supply an oxidant stream to the fuel cell stack;
a fluid sensor configured to detect a temperature associated with the thermal management fluid;
an oxidant sensor configured to detect a variable associated with the oxidant stream; and
a control system programmed to control the operation of the fuel cell system according to the method of claim 1.

25. The system of claim 16, wherein the control system is further programmed to calculate a desired temperature associated with the thermal management fluid based upon the temperature associated with the humidified oxidant stream and to increase the speed of the fan responsive to determining that the temperature associated with the thermal management fluid is greater than the desired temperature associated with the thermal management fluid.

26. The system of claim 16, wherein the control system is further programmed to calculate a desired temperature associated with the thermal management fluid based upon the temperature associated with the humidified oxidant stream and to decrease the speed of the fan responsive to determining that the temperature associated with the thermal management fluid is less than the desired temperature associated with the thermal management fluid.

* * * * *